March 5, 1968 SEIUEMON INABA ET AL 3,372,321
DIGITAL SYSTEM FOR CONTROLLING THE POSITION ALONG
A GIVEN PATH OF A MOVABLE STRUCTURE
Filed June 22, 1967 15 Sheets-Sheet 3

OPTICAL DETECTOR HEAD

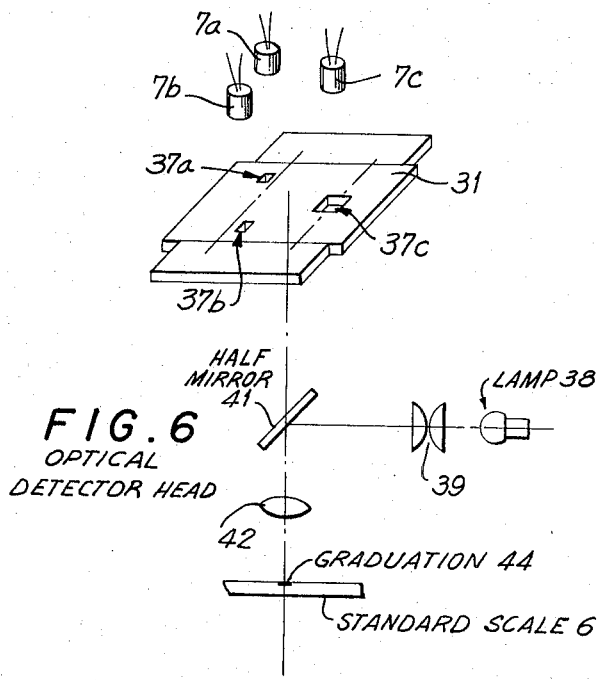
FIG. 6 OPTICAL DETECTOR HEAD
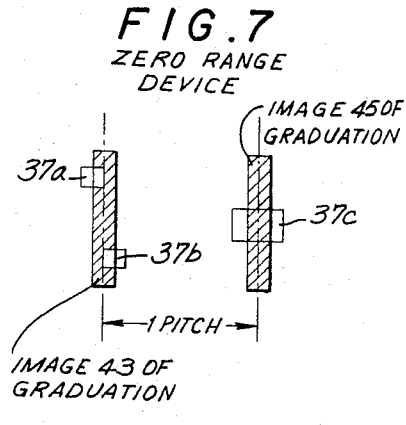
FIG. 7 ZERO RANGE DEVICE
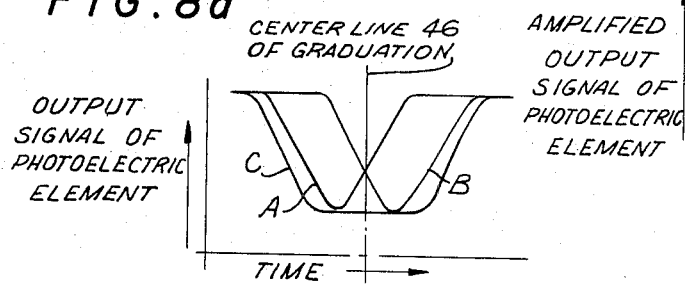
FIG. 8a
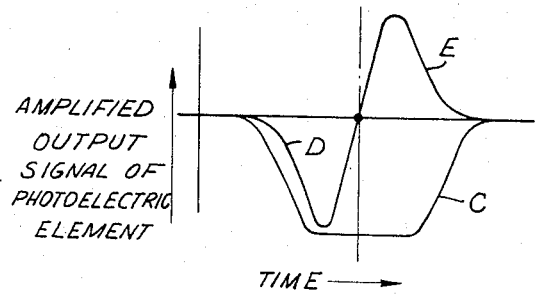
FIG. 8b
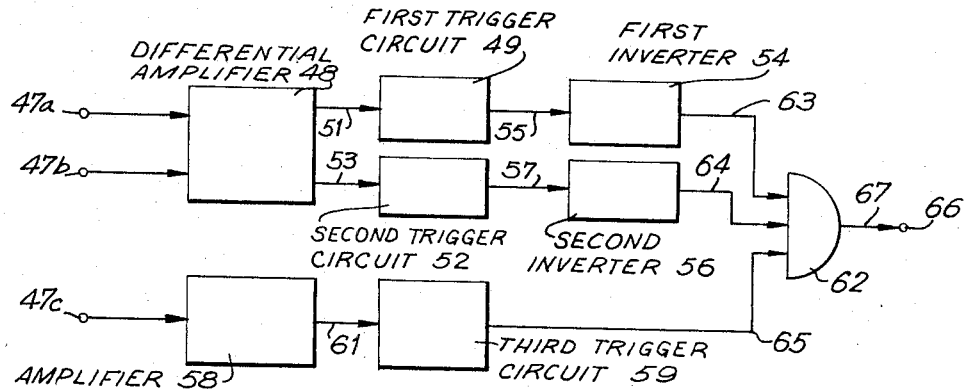
FIG. 9 CENTRAL POSITION AND ZERO RANGE INDICATOR

DIFFERENTIAL AMPLIFIER
AND SCHMITT TRIGGER

OUTPUT
SIGNALS OF
PHOTOELECTRIC
ELEMENTS

OUTPUT
SIGNALS OF
DIFFERENTIAL
AMPLIFIER

TRIGGER
OUTPUT SIGNAL

TRIGGER
OUTPUT SIGNAL

OUTPUT SIGNAL OF
PHOTOELECTRIC
ELEMENT

TRIGGER
OUTPUT SIGNAL

OUTPUT
SIGNAL

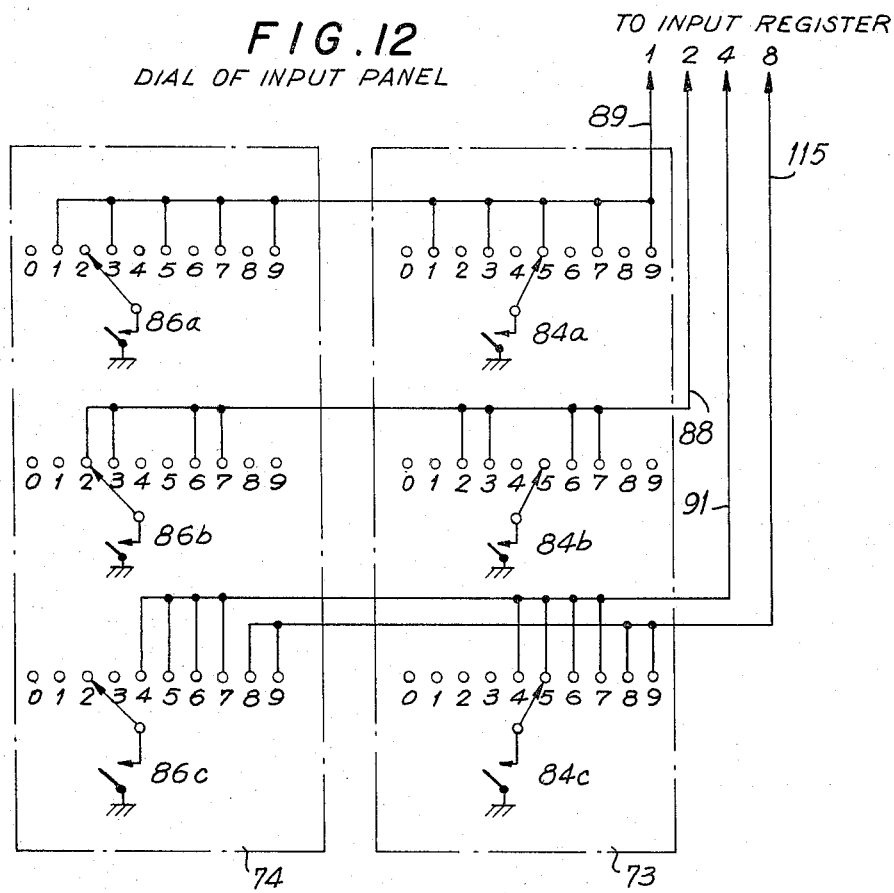
FIG.12
DIAL OF INPUT PANEL
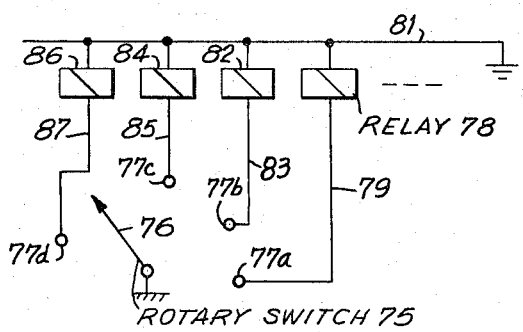
RELAY 78
ROTARY SWITCH 75

DECIMAL - BINARY
CONVERSION REGISTER

COMPARATOR

MOTOR DRIVE

REVERSIBLE SELECT GATE

REVERSIBLE BINARY COUNTER

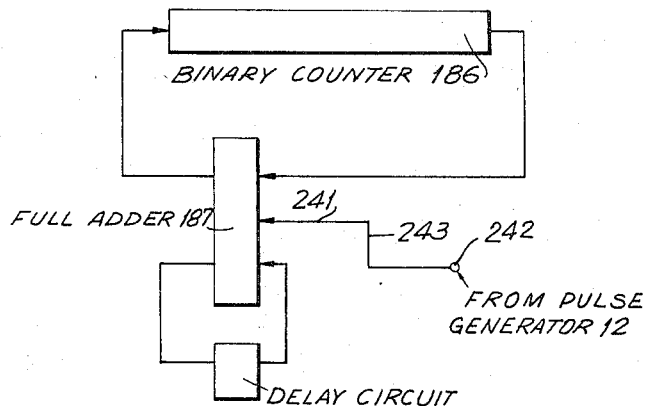
FIG.18b REVERSIBLE BINARY COUNTER
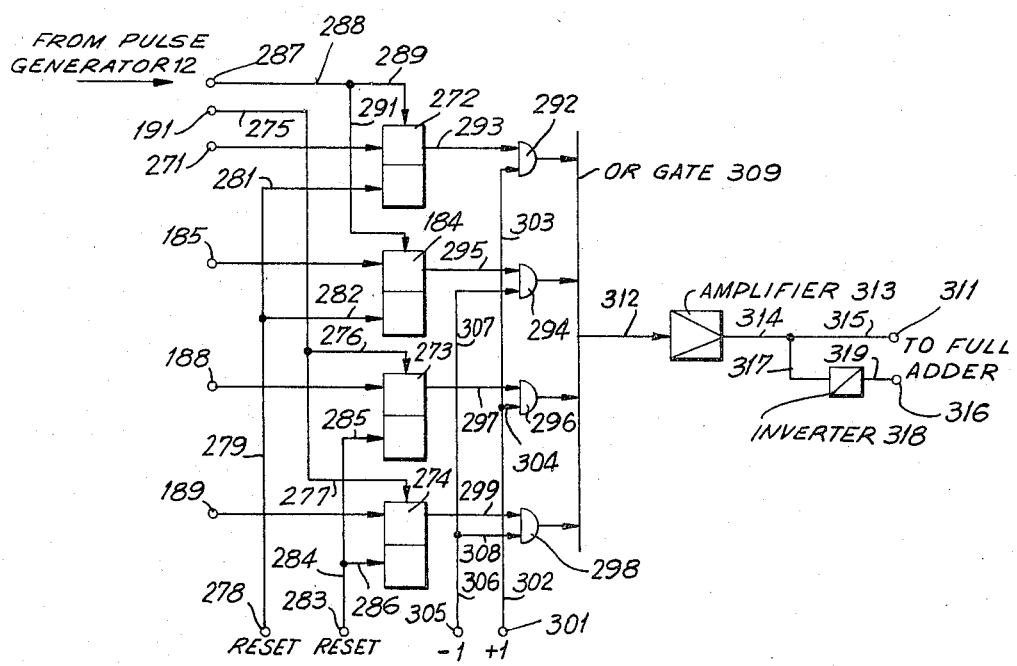
FIG.19
COMPENSATOR

COMPENSATOR

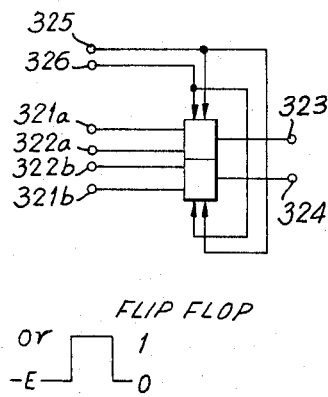
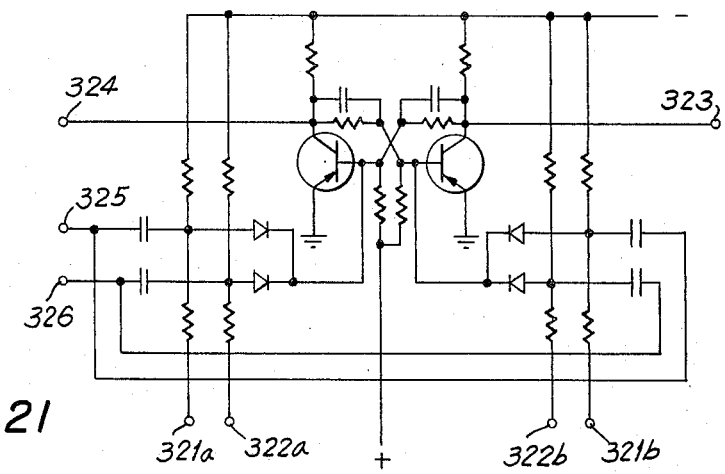
FIG. 21
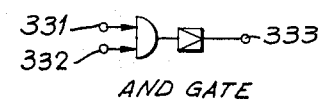
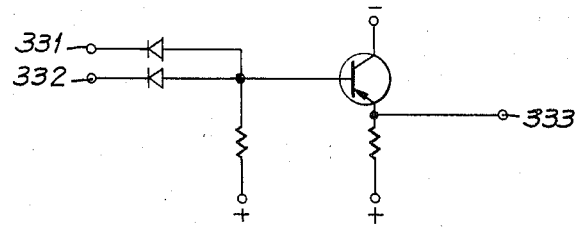
FIG. 22
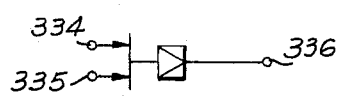
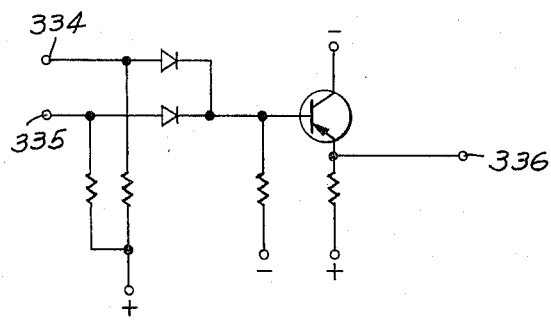
FIG. 23

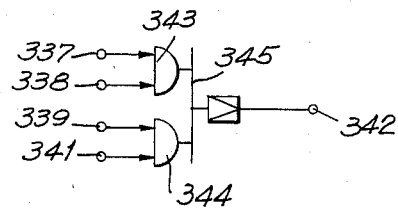
FIG.24
AND-OR GATE
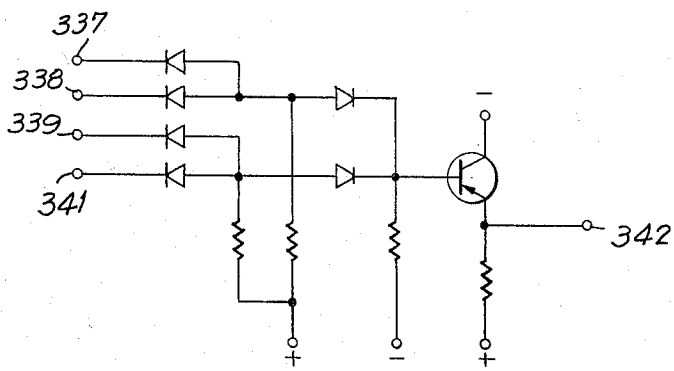
FIG.25
INVERTER
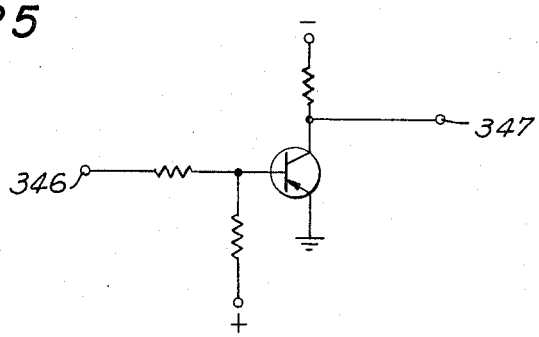

FULL ADDER

INPUT REGISTER

BINARY REGISTER

# United States Patent Office 3,372,321
Patented Mar. 5, 1968

3,372,321
DIGITAL SYSTEM FOR CONTROLLING THE POSITION ALONG A GIVEN PATH OF A MOVABLE STRUCTURE
Seiuemon Inaba and Kanryo Shimizu, Kawasaki, Tokiji Shimajiri, Mitaka-shi, and Yoshihiro Hashimoto, Naka-ku, Yokohama, Japan, assignors to Fujitsu Limited, Kawasaki, Japan, a corporation of Japan
Continuation-in-part of application Ser. No. 618,233, Feb. 23, 1967. This application June 22, 1967, Ser. No. 648,054
Claims priority, application Japan, Jan. 11, 1963, 38/1,160
7 Claims. (Cl. 318—18)

ABSTRACT OF THE DISCLOSURE

A drive is coupled to a movable structure for displacing it. A detector mounted on a fixed structure and on the movable structure, detects positional variation of the movable structure along the path thereof. The detector comprises a scale affixed to one of said structures and comprising a plurality of spaced indications. An optical detecting element is movably mounted on the other of the structures in operative proximity with the scale. The detector includes zero range device for providing a zero range at a given interval for each indication of the scale. A datum setter has a first portion selectively adjustable for setting the major amount of a desired positional datum value and a second portion selectively adjustable for setting the residual amount of the datum value. A presetting control is coupled to the optical detecting element for moving it relative to the structure in accordance with the residual amount. The presetting control comprises a first register having a content equal to that of the second portion of the datum setter. A servomotor is coupled to the optical detecting element for moving it along the given path. A pulse generator is coupled to the optical detecting element for providing pulses corresponding in number to the displacement thereof. A first counter has an input connected to the pulse generator for counting pulses generated thereby. A first comparator has an output connected to the servomotor, an input connected to the output of the first counter and an input connected to the output of the first register for comparing the contents of the first register and the first counter and for energizing the servomotor until coincidence of the contents of the first register and first counter. A drive control is coupled to the drive and comprises a second register having a content equal to that of the first portion of the datum setter. A second counter has an input connected to the detector for counting pulses generated by the detector. A second comparator has an output connected to the drive, an input connected to the output of the second counter and an input connected to the output of the second register for comparing the contents of the second register and the second counter for energizing the drive until coincidence of the contents of the second register and second counter. A zero compensator has an output connected to an input of the second counter, an input connected to the output of the first comparator, an input connected to the output of the second comparator and an input connected to the detector for selectively varying the count of the second counter in accordance with indications outside the zero range.

Description of the invention

The present application is a continuation-in-part of application Ser. No. 618,233, filed Feb. 23, 1967, and entitled "Automatic Positioning System," now abandoned, which in turn is a continuation of application S.N. 332,979, filed Dec. 23, 1963, entitled "Automatic Positioning System," and now abandoned.

The present invention relates to a digital system for controlling the position along a given path of a movable structure. More particularly, the invention relates to automatic positioning systems for the movable structures, such as tool holders, of lathes, bore drilling machines, or other machine tools, and particularly to the types of positioning devices described in pending patent application Ser. No. 332,978 of Seiuemon Inaba, Kanryo Shimizu, Tokiji Shimajiri and Hajime Mori, assigned to the assignee of this application and filed Dec. 23, 1963, wherein the movable structure, which may comprise an apron, a workpiece holder, or a tool holder, is to be moved to a predetermined location along a fixed graduated scale.

In such systems, a first, or fine or vernier control loop displaces an optical sensor in a detecting head mounted on the movable structure, until the sensor reaches a distance from its center or "home" position in the head equal to the decimal-fraction portion of a stored digital input value whose unit digit preferably corresponds to one scale graduation. A second control loop then moves the movable structure or tool holder until the sensor is at a scale line corresponding to the whole-number portion of the stored digital input values so that the center position in the head corresponds in position to the digital input value.

The operation of the first control loop may cause disagreement between the position of the movable structure and the whole-number portion of the previously stored digital input value. This may be a source of error. Also over-travel of the sensor or the movable structure and elastic deformation upon completion of positioning may produce errors.

The principal object of the present invention is to provide a new and improved automatic positioning system. The automatic positioning system of the present invention functions to control the position along a given path of a movable structure with accuracy, efficiency and reliability. The automatic positioning system of the present invention eliminates errors and disadvantages of prior art systems.

According to a feature of the invention a "zero" range about each scale line is established, and compensation at each location is accomplished in dependence upon whether the sensor or head is located within a predetermined "zero" range about each scale line.

In accordance with the present invention, a digital system for controlling the position along a given path of a movable structure movably mounted on a fixed structure comprises a drive coupled to the movable structure for displacing the movable structure. A detector is mounted on the two structures for detecting positional variation of the movable structure along the path. The detector comprises a scale affixed to one of the structures. The scale comprises a plurality of spaced indications. An optical detecting element is movably mounted on the other of the structures in operative proximity with the scale. The detector includes zero range means for providing a zero range at a given interval for each indication of the scale. A datum setter has a first portion selectively adjustable for setting the major amount of a desired positional datum value and a second portion selectively adjustable for setting the residual amount of the datum value. A presetting control is coupled to the optical detecting element for moving the optical detecting element relative to the structure in accordance with the residual amount. The presetting control comprises a first register having an output and a content equal to that of the second portion of the datum setter. A servomotor is coupled to the optical detecting element for moving the optical detecting element along the given path. A pulse generator is coupled to the optical detecting element for providing pulses corresponding in number to the displacement of the optical detecting element. A first counter has an output and an input connected to the pulse generator for counting pulses generated by the pulse generator. A first comparator has an output connected to the servomotor, an input connected to the output of the first counter and an input connected to the output of the first register for comparing the contents of the first register and the first counter and for energizing the servomotor until coincidence of the contents of the first register and first counter. A drive control is coupled to the drive. The drive control comprises a second register having an output and a content equal to that of the first portion of the datum setter. A second counter has an output and an input connected to the detector for counting pulses generated by the detector. A second comparator has an output connected to the drive, an input connected to the output of the second counter and an input connected to the output of the second register for comparing the contents of the second register and the second counter for energizing the drive until coincidence of the contents of the second register and second counter. A zero compensator has an output connected to an input of the second counter, an input connected to the output of the first comparator, an input connected to the output of the second comparator and an input connected to the detector for selectively varying the count of the second counter in accordance with indications outside the zero range.

The zero range means comprises a square wave pulse shaper and an opaque shield having a slit formed therethrough and positioned in the path of the optical detecting element. Each of the first and second counters comprises a reversible binary counter. The presetting control comprises a first fine adjustment feedback loop and the drive control comprises a second coarse adjustment feedback loop.

In order that the present invention may be readily carried into effect, it will now be described with reference to the accompanying drawings, wherein.

Figure 1:
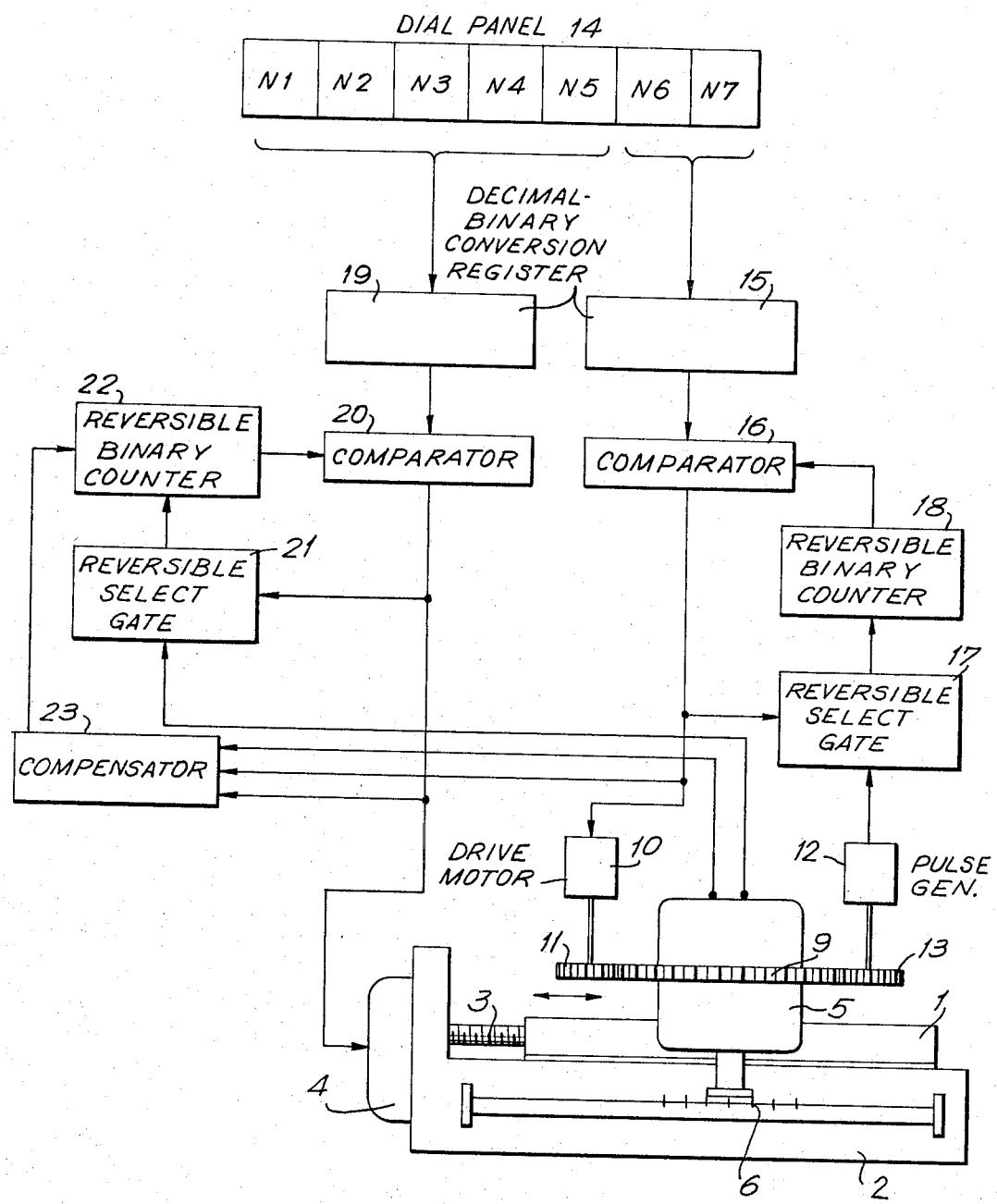
FIG. 1 is a block diagram of an embodiment of the automatic positioning system of the present invention.
Figure 5:
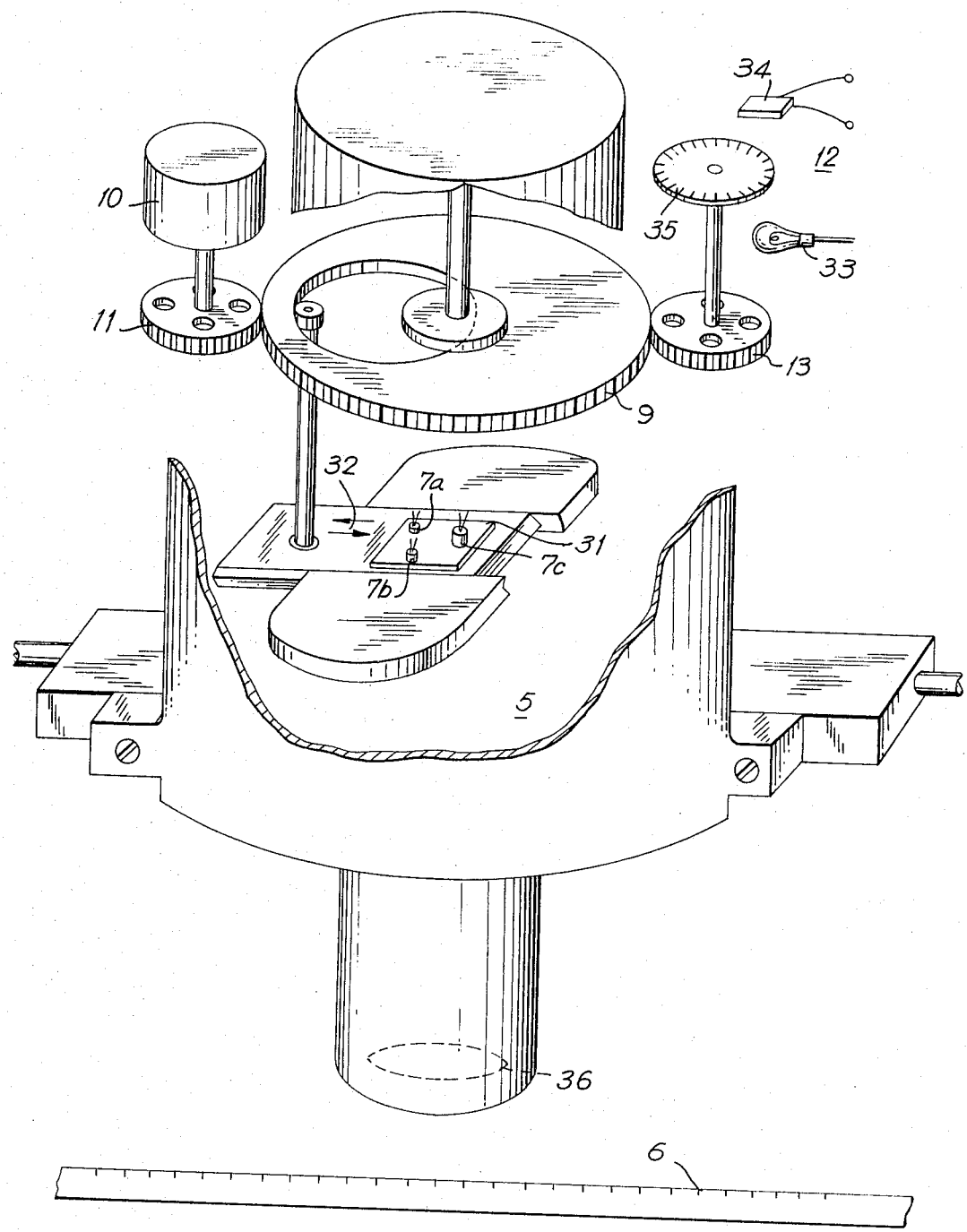
Figure 10:
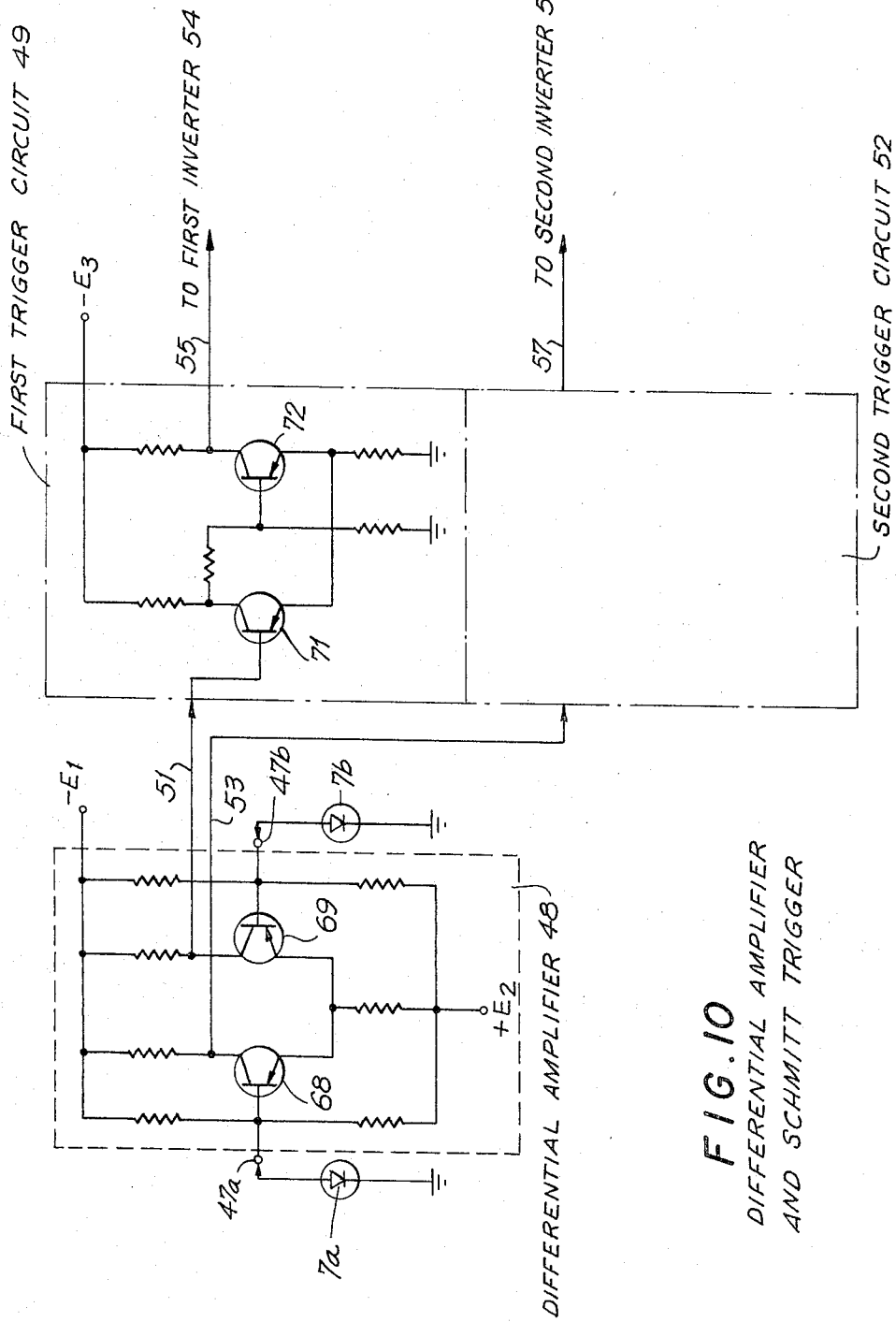
Figure 13:
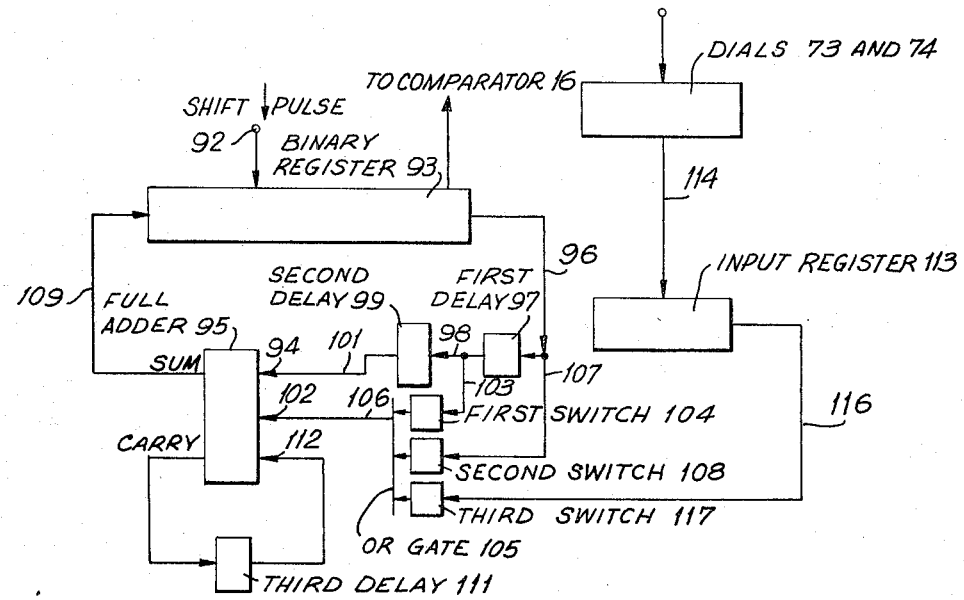
Figure 14:
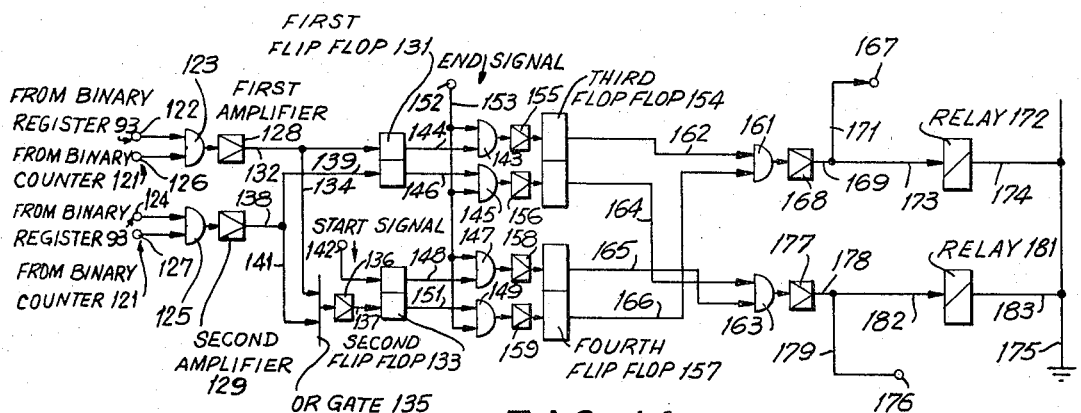
Figure 16:
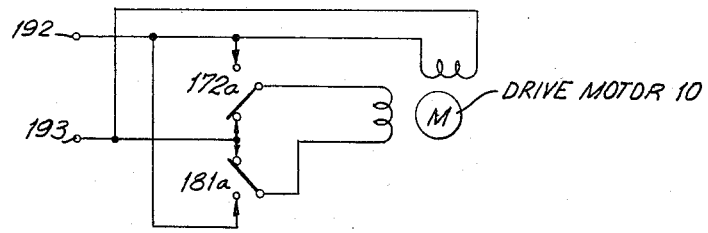
Figure 17:
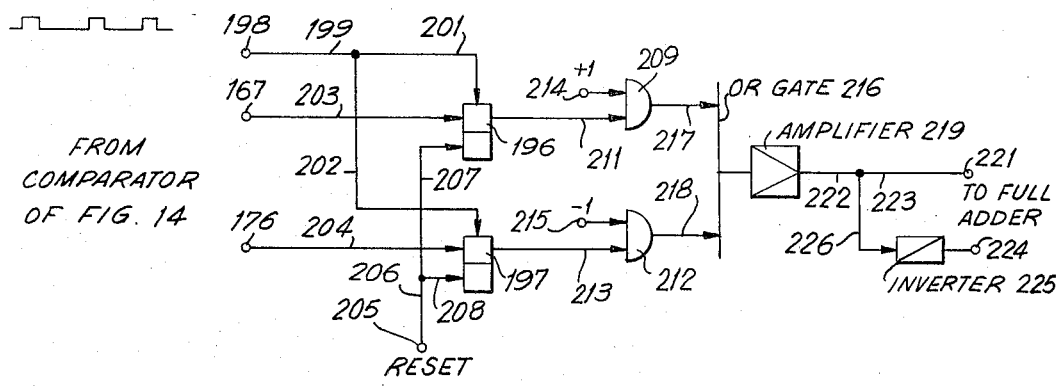
Figure 18A:
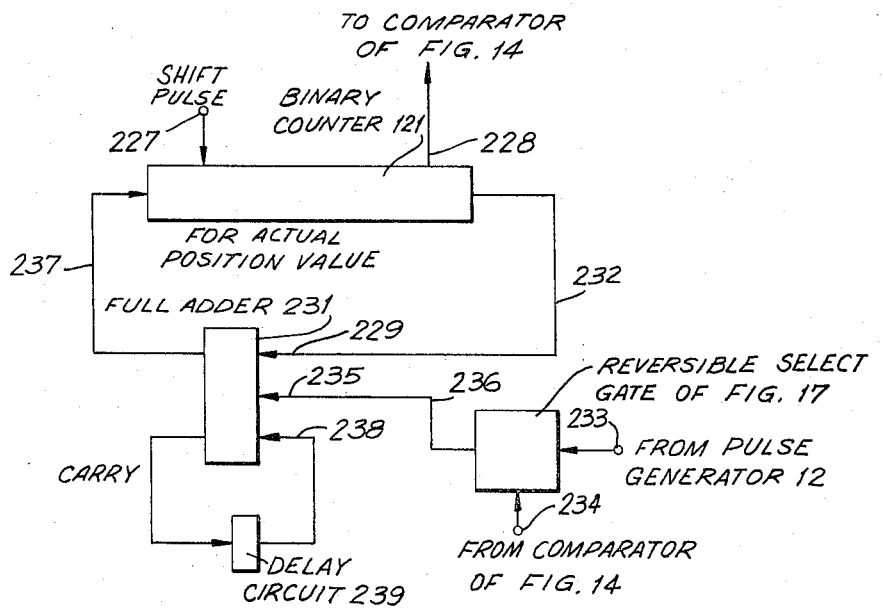
Figure 20:
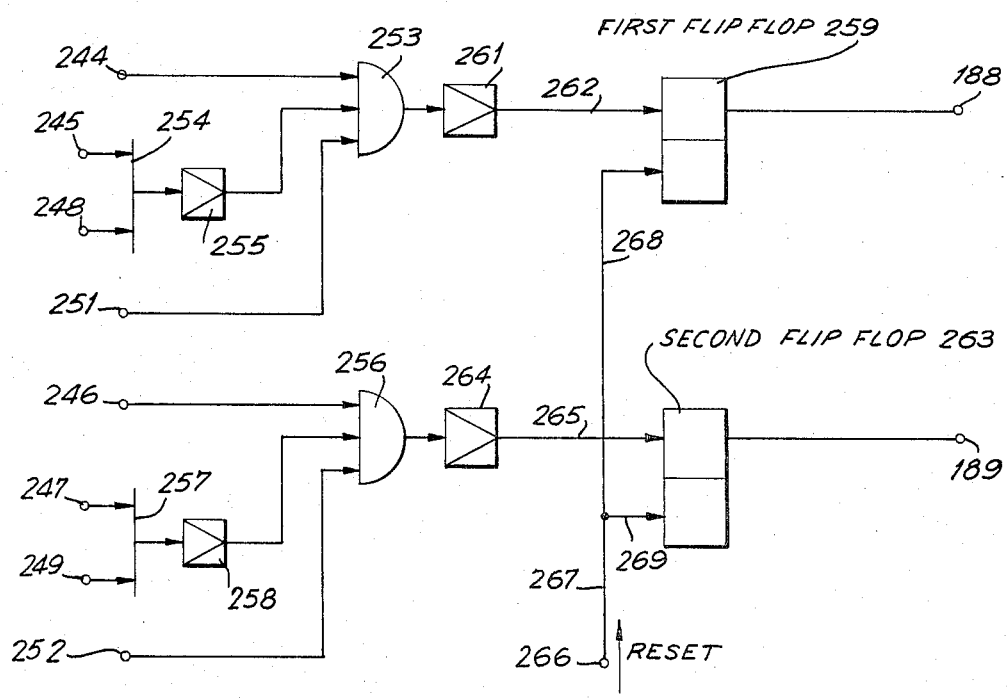
Figure 26:
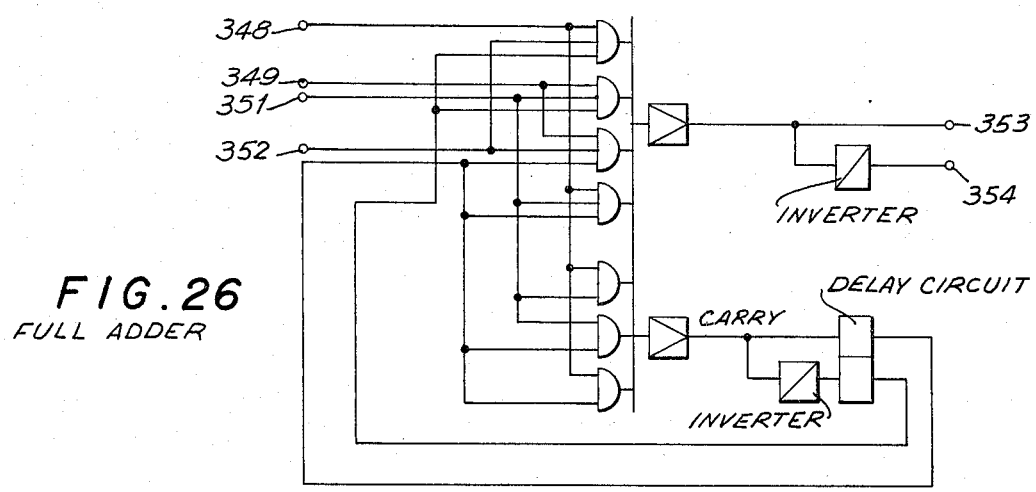
Figure 27:
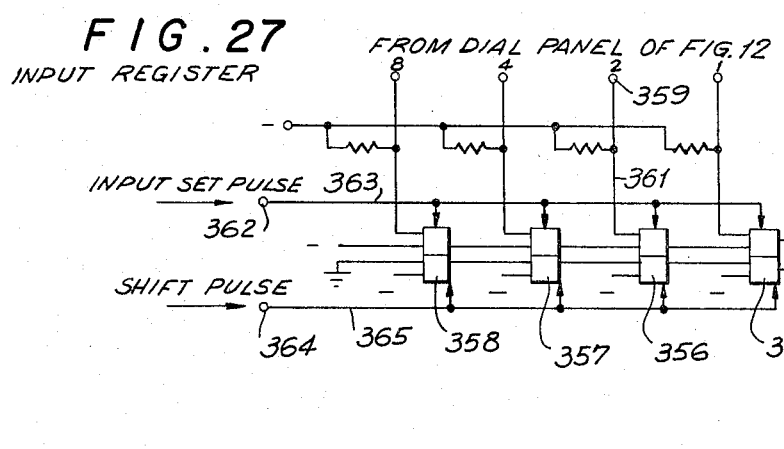
Figure 28:
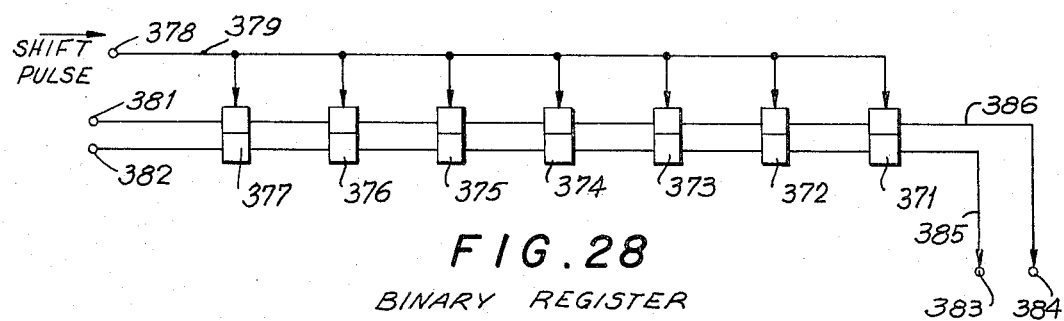

FIG. 5 is a cutaway perspective view of the optical detector head 5 and a drive motor and pulse generator applicable as the motor 10 and pulse generator 12 of the system of FIG. 1;

FIG. 6 is a schematic diagram of some of the basic components of the detector head 5 of the system of FIG. 1;

FIG. 7 is a schematic diagram of a zero range device which may be utilized as the zero range device of the system of FIG. 1 in the detector head 5 thereof;

FIGS. 8a and 8b are graphical presentations of the outputs of the sensors 7 of the detector head 5 of the system of the present invention;

FIG. 9 is a block diagram of a central position and zero range indicator which may be utilized in the detector head 5 of the system of the present invention;

FIG. 10 is a circuit diagram of the differential amplifier 48 and the first trigger circuit 49 of the central position and zero range indicator of FIG. 9;

FIGS. 11a, 11b, 11c, 11d, 11e, 11f and 11g are graphical presentations of the waveforms at various points of the circuit arrangement of FIG. 10;

FIG. 12 is a schematic diagram of a circuit of a dial portion of the dial panel 14 of the system of FIG. 1;

FIG. 13 is a schematic block diagram of a decimal-binary conversion register which may be utilized as the decimal-binary conversion register 15 or 19 of the system of FIG. 1;

FIG. 14 is a schematic block diagram of a comparator which may be utilized as the comparator 16 or 20 of the system of FIG. 1;

FIGS. 15a, 15b, 15c, 15d, 15e and 15f are graphical presentations of the waveforms at various points of the circuit arrangement of FIG. 14;

FIG. 16 is a circuit diagram of a drive for the drive motor 10 of the system of FIG. 1;

FIG. 17 is a schematic block diagram of a reversible select gate which may be utilized as the select gate 17 or 21 of the system of FIG. 1;

FIGS. 18a and 18b are schematic block diagrams of a binary counter which may be utilized as the reversible binary counter 18 or 22 of the system of FIG. 1;

FIGS. 19 and 20 are schematic block diagrams of a compensator which may be utilized as the compensator 23 of the system of FIG. 1;

FIG. 21 is a circuit diagram of a flip flop which may be utilized as the flip flop of the various figures;

FIG. 22 is a circuit diagram of an AND gate which may be utilized as the AND gate of the various figures;

FIG. 23 is a circuit diagram of an OR gate which may be utilized as the OR gate of the various figures;

FIG. 24 is a circuit diagram of an AND-OR gate which may be utilized as the AND-OR gate of FIG. 17;

FIG. 25 is a circuit diagram of an inverter which may be utilized as the inverter of the various figures;

FIG. 26 is a circuit diagram of a full adder which may be utilized as the full adder of FIGS. 13, 18a and 18b;

FIG. 27 is a circuit diagram of an input register which may be utilized as the input register of FIG. 13; and FIG. 28 is a circuit diagram of a binary register which may be utilized as the binary register of FIGS. 13, 18a and 18b.

In FIG. 1, a table 1, or other structure to be moved, of a lathe, bore drilling machine or other fabricating machine is movable on tracks on a bed 2 by a feed screw 3. A motor 4, constituting a first servo element, turns the feed screw 3, and hence moves the table 1 according to the output of a comparator 20. If necessary, the motor 4 may comprise several motors or a speed reduction device and a clutch.

An optical detector head 5 is affixed to the table 1 and cooperates with a standard graduated optical scale 6 secured to the bed 2 to form an optical system. The optical system, as shown in FIG. 2, includes a photoelectric element or sensor 7 such as, for example, a photodiode, photocell or solar cell, mounted within the head 5 for movement parallel to the scale 6.

Figure 2:
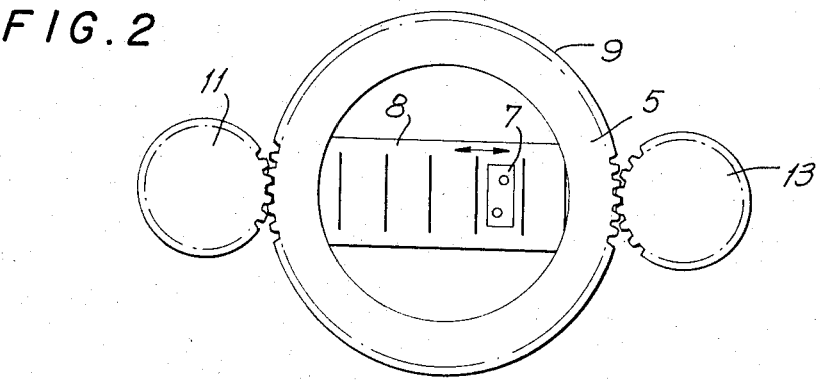
FIG. 2 is a view from below of the detector head of FIG. 1.

The sensor 7 is positioned in the head 5, as shown in FIG. 2, and a lens projects the magnified image 8 of the scale 6 thereon. The sensor 7 provides one pulse each time an image of a graduation of the scale passes said sensor, due to the movement of the head 5 with the table 1 or due to the movement of said sensor within said head.

Externally surrounding the optical detector head 5 is a gear 9, whose rotary motion changes the position of the photoelectric element or sensor 7 in the direction of the arrow in FIG. 2. The gear meshes with a gear 11, which is driven by a drive motor 10. The drive motor 10 forms part of a second servo element. The gear 9 also meshes with a gear 13 which actuates a pulse generator 12. Accordingly, the drive motor 10 displaces the position of the sensor 7 an amount which the pulse generator 12 detects.

Decimal position-control or input data is entered in a dial panel 14 having seven dials for seven digits. Five digits are integers and 2 digits are decimal fractions. A decimal-binary conversion register 15 provides the binary value of the decimal fraction to a comparator 16. The comparator 16 compares the binary value of the decimal fraction with another input thereto and controls the drive motor 10 in accordance with the output value and polarity of said comparator. The polarity of the comparator 16 also determines, through a reversible select gate 17, whether pulses from the pulse generator 12 are added to or subtracted from the value or count in a reversible binary counter 18. The reversible binary counter 18 indicates the position of the sensor 7 (FIG. 2) relative to its center position in the detector head 5, and applies a value corresponding to said position to the comparator 16. The comparator 16 may then compare the desired decimal fraction input to the actual position of the sensor 7 (FIG. 2) so as to provide an output signal to the drive motor 10 which will move said sensor in the right direction. The components 10, 11, 9, 13, 12, 17, 18 and 16 form a first loop.

Thus, the drive motor 10, for displacing the sensor 7 (FIG. 2), is controlled by the data entered into the two decimal fraction places N6 and N7 of the dial panel 14. The decimal fraction data is stored in the decimal-binary conversion register 15 after being converted to binary numbers. The output of the conversion register 15 operates the drive motor 10. The displacement of the sensor 7 (FIG. 2) by the servomotor or drive motor 10 is detected by the gear 13, converted into an electrical pulse signal by the pulse generator 12 and fed to the reversible binary counter 18 through the reversible select gate 17. The reversible select gate 17 is controlled by the operating direction of the drive motor 10. The content of the reversible binary counter 18 is compared with that of the decimal-binary conversion register 15 by the comparator 16 and an agreement in the comparison stops the rotary motion of the drive motor 10.

If the gear 9 is rotated by the drive motor 10, the sensor 7 (FIG. 2), provided in the detector head 5, will be displaced by means not illustrated in a direction, indicated in FIG. 2 by the arrow heads, depending upon the rotation. The sensor 7 is thus preset in accordance with the value of the decimal fraction in the two decimal fraction places N6 and N7 in the input data of the dial panel 14. The sensor 7 is set to the "low" side of the scale, so that the center of the detector head 5 is higher than said sensor by the correct amount.

The second control loop driving the table 1 includes the dial panel 14, a decimal-binary conversion register 19, a comparator 20, the drive motor 4, the lead screw 3, the table 1, the detector head 5, a reversible select gate 21 and a reversible binary counter 22.

In the second control loop, the value of the five integral digits N1, N2, N3, N4 and N5 of the input to the dial panel 14 are stored in the decimal-binary conversion register 19, whose modified output operates the drive motor 4 through the comparator 20. Rotary motion of the drive motor 4 moves the table 1 by means of the feed screw 3. As the table 1 moves, the detector head 5 mounted on said table also moves. The sensor 7 (FIG. 2) reads out the graduations on the standard scale 6, which is divided into units of 1 mm. and produces electrical pulse signals which are fed to the binary reversible counter 22 through the reversible select gate 21.

The reversible select gate 21 detects the polarity of the output of the comparator 20. The polarity of the output of the comparator 20 depends upon which input to said comparator is larger and thereby determines the direction of movement of the table 1. The reversible select gate 21 then determines whether the pulses from the detector head 5 are to be added to or subtracted from the value or count in the reversible binary counter 22 in accordance with the feed direction. The reversible binary counter 22 then counts or stores a value or count corresponding to the position of the detector head 5. The content or count of the reversible binary counter 22 is compared with that of the conversion register 19 by the comparator 20. An agreement in the comparsion stops the rotary motion of the drive motor 4. The table 1 stops at a position where the sensor 7 (FIG. 2) just reads out a graduation of the scale 6; that is, when said sensor coincides with a graduation of the magnified scale image 8. Consequently, the table 1 is moved by the input to both the first and second control loops a distance corresponding to the total input data, N1 N2 N3 N4 N5.N6 N7, including the value of the decimal fraction placed in the input to the dial panel 14, and the value of integral digits in the input data applied to the second control loop.

The stopping of the drive motor 4 is more accurately positioned by gradually reducing the speed of the table 1. When the aforedescribed control device is utilized, wherein the detector head 5 is preset by the first control loop, the content or count of the reversible binary counter 22 of the second control loop may become incorrect. Furthermore, the detector head 5 may be displaced from the proper graduation position upon completion of positioning, due to over-movement of the table and elastic deformation. This may result in disagreement between the content or count of the reversible binary counter 22 and the actual position of the table 1.

Figure 3A:
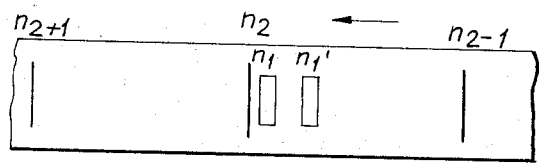
FIGS. 3a, 3b and 3c are schematic diagrams showing the relative positions of the sensors and the scale lines of the system of FIG. 1.
Figure 3B:
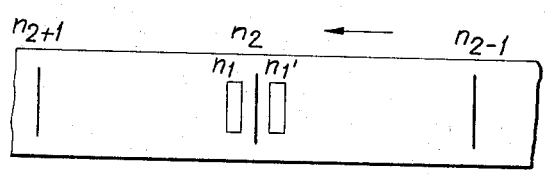
Figure 3C:
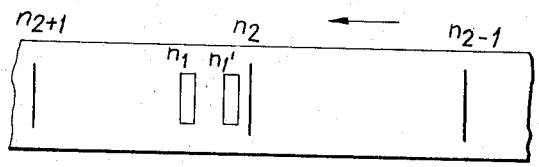

In order to further explain the invention, reference is now made to FIGS. 3a, 3b and 3c. For this purpose, it is convenient to designate the seven digit input data, which may be N1' N2' N3' N4' N5'.N6' N7', as $n'$ and to correspondingly designate N1' N2' N3' N4' N5' as $n_2'$ and N6' N7' as $n_1'$. Analogously, the actual positional data N1 N2 N3 N4 N5.N6 N7 of the controlled object is designated as $n$. N1 N2 N3 N4 N5 is designated as $n_2$ and N6 N7 is designated as $n_1$. On this basis, two principal examples (1) and (2) of control situations may be distinguished and each of them may occur in three subsidiary aspects (a), (b) and (c), as hereinafter described.

(1) $\qquad n_1 < n_1'$ (a) Both $n_1$ and $n_1'$ may be dislocated to the higher value side with respect to the prescribed datum values respectively.

(b) The prescribed datum value may be located between $n_1$ and $n_1'$.

(c) Both $n_1$ and $n_1'$ may be located on the lower value side with respect to the prescribed datum values.

(2) $\qquad n_1 > n_1'$

This example may be subclassified, similarly to example (1), into three subsidiary possibilities.

In example 1(a), due to over-feeding or under-feeding in the preceding positioning operation, or due to other reasons, the actual location of the detector head 5 is represented by the preset amount $n_1$ being dislocated to the right side of a given scale line $n_2$ on the standard measure 6. In examples 1(b) and 1(c), the location of the detector head 5 is represented by the preset amount $n_1$ being on the left side of the scale line $n_2$. However, in example 1(b), the input value $n_1'$ for the next positioning operation is located at the right side of the scale line $n_2$ to produce a higher value for the detector head 5. The amounts $n_1$ and $n_1'$ are both located in the left side of the scale line $n_2$ to produce a lower value in example 1(c).

FIGS. 3a, 3b and 3c show the aforedescribed three examples 1(a), 1(b) and 1(c) when $n_1 < n_1'$ (the new vernier value exceeds the old). In FIGS. 3a, 3b and 3c, if the total value goes up, $n < n'$, so that the detector head 5 is moved to a higher value (left side), and the table 1 will also move. When the photoelectric element 7, located in the position $n_1'$ of the detector head 5, reaches the scale line $n_2$, a pulse may be detected by said head. Since the content or count of the reversible binary counter 22 is already $n_2$, said count is advanced to $n_2+1$ and disagrees with the then position of the table. That is, the content or count of the reversible binary counter 22 must then be reduced by $+1$.

Similarly to the foregoing, reduction by +1 is necessary in example 1(b). On the other hand, in example 1(c), only when the scale line $n_2+1$ coincides with the position of the scale line $n_2$ will a pulse be detected. In this case, the aforedescribed disagreement may not be caused.

In the same manner, the cases of $n_2 > n_2'$ (integral value decreasing) and $n > n'$ (total value decreasing) will create the need for compensation, as shown in Table I. In Table I, the pulse, which is detected when the photoelectric element 7 of the optical system is present from the position $n_1$ to the position $n_1'$ due to passing across the scale of the standard measure, is neglected.

TABLE I

|  |  | Compensation | | |
|---|---|---|---|---|
|  |  | (a) | (b) | (c) |
| $n<n'$ ($n_2 \neq n_2'$) | $n_1 < n_1'$ | −1 | −1 | 0 |
| $n<n'$ ($n_2 \neq n_2'$) | $n_1 > n_1'$ | −1 | 0 | 0 |
| $n>n'$ ($n_2 \neq n_2'$) | $n_1 < n_1'$ | 0 | 0 | +1 |
| $n>n'$ ($n_2 \neq n_2'$) | $n_1 > n_1'$ | 0 | +1 | +1 |

The compensation, as shown in Table I, could be accomplished by using the content or count of the reversible binary counter 18 of the first control loop and the content or count of the reversible binary counter 22 of the second control loop and also by determining which of the conditions (a) (b) and (c) exists. Correct determination of these conditions, however, requires a complicated device which creates some difficulty.

An additional difficulty may arise when $n_2 = n_2'$, which is not included in Table I. In the automatic position system of the present invention, as shown in FIG. 1, the direction of movement of the table 1 is simply determined by a determination of the relationship of the values $n_2$ and $n_2'$ or the integral digits. It would therefore be necessary to determine the direction of movement of the table 1.

The automatic positioning system of the present invention eliminates the aforementioned difficulties and provides effective compensation.

In accordance with the present invention, a zero range of a given interval is established in each scale of the standard measure, and the position of the detector head 5 is always located in the zero range when positioning is completed. If the value of $n'$ of the decimal fraction digits in the input data is within the zero range, no pulse is detected, although the table 1 moves the photoelectric element 7 of the detecting means or detector head 5 across the scale line located within the zero range. For normal control operation, compensation is necessary only for $n_1'$ located outside the zero range. When the value of higher digits of the input data and the then value agree ($n_2 = n_2'$), and $n_1'$ is located in the zero range, the table 1 is not moved, but remains in position. That is, the zero range represents an error allowable limit.

The zero range setting is provided by equipping the detector head 5 with a shaper circuit for producing a square wave. The zero range setting may also be provided by positioning a slit in front of the sensor 7. The zero range setting may also be provided by utilization of the output of the sensor 7 without any additional sensor.

The width or duration of the zero range is not necessarily of precise or constant value. However, as hereinbefore stated, since it is impossible to position in a range less than the zero range width or duration, a suitable selection is required in accordance with the structure to be controlled.

Figure 4A:
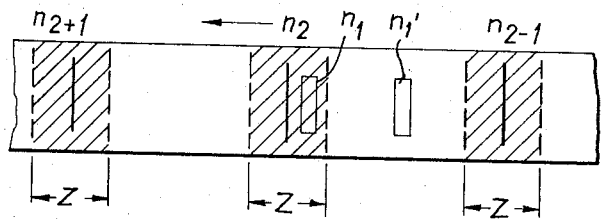
FIGS. 4a and 4b are schematic diagrams showing the relative positions of sensors and scale lines to aid in explaining the invention.
Figure 4B:
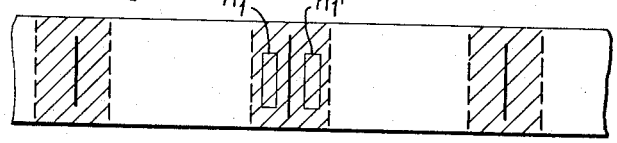

Upon completion of the positioning when the then position is not in the zero range, an alarm signal may be utilized to indicate that the control system is in an abnormal condition. Compensation in accordance with the present invention is explained in FIGS. 4a and 4b. FIGS. 4a and 4b show where the zero range of determined width is to be set in each scale position.

It is of no significance in FIGS. 4a and 4b if $n_1$ and $n_1'$ are on the high or low value side of the scale $n_2$. It is only necessary to determine whether $n_1'$ is inside or outside the zero range. If the $n_1'$ is outside the zero range (FIG. 4a), compensation is necessary. If $n_1'$ is inside the zero range (FIG. 4b), no compensation is necessary. Compensation must be provided in accordance with Table II.

TABLE II

|  |  | Compensation | |
|---|---|---|---|
|  |  | a | b |
| $n<n'$ | $n_1 < n_1'$ | −1 | 0 |
| $n<n'$ | $n_1 > n_1'$ | 0 | 0 |
| $n>n'$ | $n_1 < n_1'$ | 0 | 0 |
| $n>n'$ | $n_1 > n_1'$ | +1 | 0 |

If $n<n_1'$ and is on the high value side of the zero range, the content or count of the reversible binary counter 22 of the second control loop is decreased by +1. If $n>n'$ and $n_1 > n_1'$, and $n_1'$ is on the low value side of the zero range, the count of the reversible binary counter 22 is increased by +1.

The foregoing compensation is provided by a compensator compensation circuit 23 of the system of FIG. 1. The compensator 23 is such that the value $n_1'$ of the lower digits fed to the first control loop and the corresponding value $n_1$ of the then position are compared at the same time that the total input data $n'$ and the data $n$ of the corresponding position of the table 1 are compared. In accordance with the aforementioned two comparisons and with the zero range signal supplied by the detector head 5, the compensation signal is supplied to the reversible binary counter 22.

If the table 1 is positioned at a certain location by the preceding signals, the decimal fraction digits and the integral digits of the old input data $n$ (which is N1 N2 N3 N4 N5·N6 N7), which is stored respectively in the reversible binary counters 18 and 22, is maintained even after completion of the positioning operation. The new input data $n'$ (which is N1' N2' N3' N4' N5'·N6' N7') is supplied to the conversion registers 15 and 19 from the dial panel 14, and compared by the comparators 16 and 20. The comparison results are supplied to the compensator 23. The detector head 5 supplies the zero range signal to determine whether the value $n_1'$ of the decimal fraction of the new input data $n'$ is located inside or outside the zero range. The compensator 23 compensates the count or content of the reversible binary counter 22 by comparing the results, as indicated in Table II.

The following briefly explains the invention with respect to an actual example. It may be assumed that the standard scale 6, 8 is graduated by 1 mm. spaces and that the preset counter is used respectively for the comparator 16 and the comparator 20. If the position input data $n'=22389.63$ is entered in the dial panel 14, the high five digits of the data, or $n_2'$, which is 22389, are supplied to the second control loop. The low two digits of the data, or $n_1'$, which is 63, are supplied to the first control loop. If the input data is supplied to the comparator 16, the drive motor 10 is operated by the output of said comparator, and the photoelectric element 7 of the detector head 5, is displaced as indicated by the arrows. If the displacement of as much as 0.63 mm., corresponding to the value of $n_1'$ of the low two digits of the input data, is supplied to the photoelectric element 7, the number of pulses provided by the pulse generator 12 becomes equal to the input value in the dial panel 14, and operation of the drive motor 10 stops. The presetting of the detector head 5 is thus completed.

On the other hand, the comparator 16 compares the value of the low two digits $n_1'=63$ in the input data with the corresponding low two digits $n_1=00$ of the data of the actual position of the table 1. The comparators 16 and 20 compare the total value $n'$ of the input data with the data of the actual position $n=00000.00$ of the table 1. The results of the comparisons are supplied to the compensation circuit 23. At such time, the zero range signal of the detector head 5 indicates that the total input data and the low two digits of the input data are both bigger than the corresponding value of the position of the table 1 and that $n_1'$ is located outside the zero range, by feeding one pulse. The value 1 is then deducted by the output of the compensating circuit 23 from the content or count of the reversible binary counter 22.

After the content or count of the reversible binary counter 22 is compensated, the drive motor 4 is operated by the output of the comparator 20 to move the table 1 in the required direction. An agreement of the content or count of the reversible binary counter 22 with the integral digits, indicated by the dial panel 14, will stop the motor 4 and thereby stop the movement of the table. Prior to the commencement of movement of the table, the photoelectric element 7 of the detector head 5 is preset by a distance corresponding to the decimal fraction of the input data. The movement of the table 1 is controlled by the preset amount, that is, by the distance corresponding to the total input data including the decimal fraction digits of the input. If the decimal fraction digit value $n_1'$ of the new input data $n'$ is located inside the zero range, the zero range signal will be fed to the compensation circuit or compensator 23 by the detector head 5 to indicate that no compensation is required. At this time, if the value $n_2'$ of the integral digits of the new input data $n'$ is the same as the then value, the table will not be moved.

In Table I, the first two columns indicate the prevailing conditions and the last three columns denote the compensation or correction required when the condition of FIG. 3a, FIG. 3b or FIG. 3c also prevails. In Table II, the first two columns indicate the prevailing conditions and the last two columns denote the compensation or correction required when the condition of FIG. 4a or FIG. 4b also prevails.

FIG. 5 discloses the optical detector head 5, the drive motor 10 and the pulse generator 12 of FIG. 1. A plurality of photoelectric elements or sensors 7a, 7b and 7c are affixed to a plate 31 which is movably mounted and is moved in the directions of the arrows 32. The plate 31 is thus moved in directions parallel to the length of the standard scale 6.

As the photoelectric elements or sensors 7a, 7b and 7c are moved, they produce output signals which are converted into a plurality of pulses by the pulse generator 12. The pulse generator 12 may comprise, for example, a source of light or lamp 33 and a photosensitive device 34 positioned in spaced relation with said lamp. A slotted disc 35 is interposed between the lamp 33 and the phototensitive device 34. This constitutes a known type of mechanical pulse generator.

A lens 36 is utilized to direct the image of the scale 6 on to the appropriate surface within the detector head 5. Although three photoelectric elements are disclosed in FIG. 5, two or four such elements may be utilized.

FIG. 6 discloses some of the basic components of the optical detector head 5 of FIG. 1. In FIG 6, the photoelectric elements 7a, 7b and 7c are shown separated from the plate 31, in order to illustrate the apertures 37a, 37b and 37c formed through said plate. In actuality, the photoelectric element 7a is mounted on the plate 31 over the aperture 37a, the sensor 7b is mounted on said plate over the aperture 37b and the sensor 7c is mounted on said plate over the aperture 37c.

A lamp 38 provides light upon the scale 6 via a suitable lens system which also directs the light impinging upon said scale to the photosensitive surfaces of the photoelectric elements 7a, 7b and 7c via the corresponding apertures through the plate 31. The lens system may comprise, for example, a lens 39, a half mirror 31 and a lens 42.

FIG. 7 shows a zero range device which may be utilized as the zero range device in the detector head 5 of FIG. 1. In FIG. 7, a magnified image 43 of a graduation such as, for example, a graduation 44 (FIG. 6) of the scale 6, is projected on to the undersurface of the plate 31. Another image 45 of a graduation is also projected on to the undersurface of the plate 31. The graduation images 43 and 45 are indicated as cross hatched areas in order to enhance the clarity of illustration and are spaced from each other by a single pitch.

The apertures 37a and 37b formed through the plate 31 are spaced from each other in the direction of length of the image 43, but are closely adjacent each other in the direction of width of said image, so that each of said apertures has an edge which is coincident with the lengthwise axis of said image and each of said apertures is positioned adjacent a corresponding end of said image. The aperture 37a extends approximately halfway in coincidence with the image 43 and extends approximately halfway beyond one lengthwise edge of said image. The aperture 37b extends approximately halfway in coincidence with the image 43 and extends approximately halfway beyond the other lengthwise edge of said image. The aperture 37c coincides exactly with the center of the image 45. Thus, the central portion of the aperture 37c coincides with the central portion of the image 45 and said aperture extends over an equal area beyond each lengthwise edge of said image. The aperture 37c is thus spaced approximately a single pitch from the apertures 37a and 37b. The area of the aperture 37c is between three and four times larger than the area of the aperture 37a or the area of the aperture 37b.

The zero range is determined by the area of the aperture 37c. The light which impinges upon the photoelectric element 7c passes through the aperture 37c and the output of said photoelectric element is the zero range signal. As hereinbefore described, the zero range signal, provided by the photoelectric element 7c determines whether or not it is necessary to compensate the reversible binary counter 22.

FIGS. 8a and 8b illustrate the outputs of the sensors 7a, 7b and 7c of FIGS. 5 and 6. In FIG. 8a, the abscissa represents time and the ordinate represents the output signal such as, for example, voltage, of the photoelectric element. Thus, the output signal of the photoelectric element 7a of FIG. 6 is indicated as curve A, the output signal of the photoelectric element 7b of FIG. 6 is indicated as curve B and the output signal of the photoelectric element 7c of FIG. 6 is indicated as curve C. As indicated, all three curves are symmetrical about the center line 46 of the graduation.

In FIG. 8b, the abscissa represents time and the ordinate represents the amplified output signal of the photoelectric element, as far as the photoelectric elements 7a and 7b are concerned. The normal output signal of the photoelectric element 7c is indicated as curve C in FIG. 8b and is merely transposed from FIG. 8a. In FIG. 8b, the outputs of the photoelectric elements 7a and 7b are amplified by a differential amplifier and the curves D and E are the differential-amplified outputs of said photoelectric elements.

FIG. 9 discloses a central position and zero range indicator which may be utilized in the detector head of FIG. 5. In FIG. 9, the output signal of the first photoelectric element 7a, represented by curve A of FIG. 8a, is applied to a first input terminal 47a. The output signal of the second photoelectric element 7b, represented by curve B of FIG. 8a, is applied to a second input terminal 47b. The output signal of the third photoelectric element 7c, represented by the curve C of FIG. 8a, is applied to a third input terminal 47c.

The first and second input terminals 47a and 47b are connected to the inputs of a differential amplifier 48 which functions to differentiate the output signals of the first and second photoelectric elements 7a and 7b to provide the curves D and E of FIG. 8b. A first output of the differential amplifier 48 is connected to the input of a first trigger circuit 49 via a lead 51. A second output of the differential amplifier 48 is connected to the input of a second trigger circuit 52 via a lead 53. The output of the first trigger circuit 49 is connected to the input of a first inverter 54 via a lead 55. The output of the second trigger circuit is connected to the output of a second inverter 56 via a lead 57.

The third input terminal 47c is connnected to the input of an amplifier 58. The output of the amplifier 58 is connected to the input of a third trigger circuit 59 via a lead 61. The amplifier 58 amplifies the output signal of the third photoelectric element 7c and produces an output signal in the lead 61 which is the zero range signal. The output of the first inverter 54 is connected to an input of an AND-gate 62 via a lead 63. The output of the second inverter 56 is connected to another input of the AND-gate 62 via a lead 64. The output of the third trigger circuit 59 is connected to another input of the AND-gate 62 via a lead 65. The output of the AND-gate 62 is connected to an output terminal 66 via a lead 67.

FIG. 10 is a circuit diagram of the differential amplifier 48 and the first trigger circuit 49 of the central position and zero range indicator of FIG. 9. Since the first, second and third trigger circuits are identical to each other, the circuit of only the first trigger circuit 49 is shown in FIG. 10. Actually, each of the first, second and third trigger circuits 49, 52 and 59 is a Schmitt trigger circuit. Each of the differential amplifier 48 and the first, second and third trigger circuits is a known circuit and is therefore not described in detail, although each of these circuits is illustrated in detail.

Figure 11A:
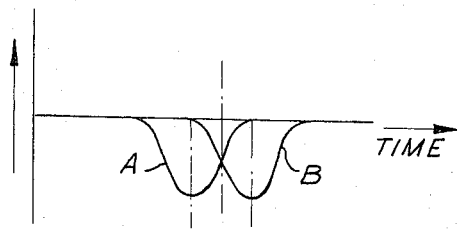

In FIG. 10, the first photoelectric element 7a, indicated as a photodiode, is connected to the first input terminal 47a. The second photoelectric element 7b, indicated as a photodiode, is connected to the second input terminal 47b. The first input terminal 47a is connected to the base electrode of a first transistor 68 and the second input terminal 47b is connected to the base electrode of a second transistor 69. FIGS. 11a to 11g illustrate the waveforms which appear at different parts of the circuit arrangement of FIG. 10. The output signals of the first and second photoelectric elements 7a and 7b, appearing at the first and second input terminals 47a and 47b, are indicated in FIG. 11a as curves A and B. The curves A and B of FIG. 11a are the same as the curves A and B of FIG. 8a.

Figure 11B:
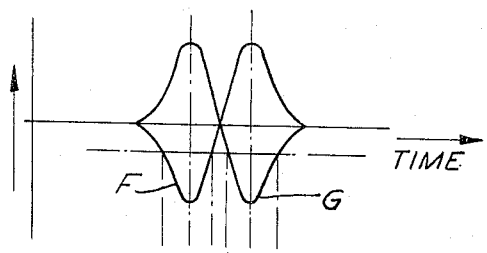

FIG. 11b illustrates the output signals of the differential amplifier 48, appearing in the first output lead 51 and the second output lead 53, respectively. The output signal in the first output lead 51 is represented by curve F and the output signal in the second output lead 53 is represented by the curve G of FIG. 11b. In FIG. 11b, the abscissa represents time and the ordinate represents the output signals of the differential amplifier.

Figure 11C:
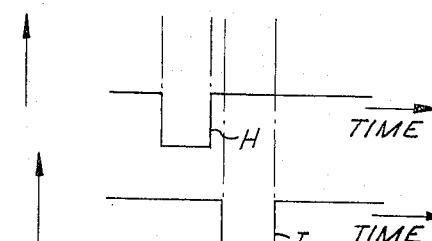
Figure 11D:
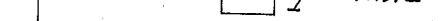

The first output signal of the differential amplifier 48 in the first output lead 51 thereof is supplied to the input of the first trigger circuit 49. The second output signal of the differential amplifier 48 in the second output lead 53 thereof is supplied to the input of the second trigger circuit 52. The lead 51 is connected to the base electrode of a first transistor 71 of the first trigger circuit 49. When the signal in the lead 51 decreases to a point below the trigger level, the first transistor 71 switches to its conductive condition and a second transistor 72 of the first trigger circuit 49 switches from its formerly conductive condition to its non-conductive condition. The first trigger circuit 49 then produces in the lead 55 an output wave of the type shown in FIG. 11c. When the second trigger circuit 52 is supplied with an output signal from the differential amplifier 48, said second trigger circuit provides an output signal of the type illustrated in FIG. 11d in the lead 57. In each of FIGS. 11c and 11d, the abscissa represents time and the ordinate represents the trigger output signal. The signal in the lead 55 is indicated in FIG. 11c by curve H. The signal in the lead 57 is indicated in FIG. 11d by curve I.

Figure 11E:
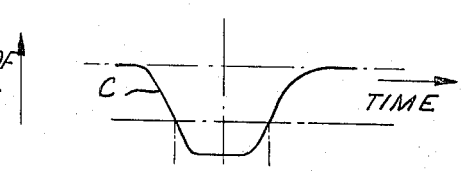
Figure 11F:
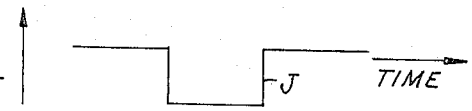
Figure 11G:
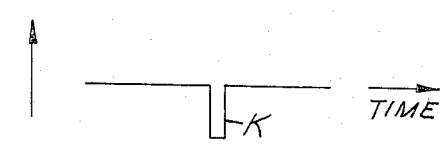

FIG. 11e shows the output signal of the third photoelectric element 7c as curve C which is identical to curve C of FIGS. 8a and 8b. The output signal of the photoelectric element 7c is supplied to the third input terminal 47c of FIG. 9 and the output of the third trigger circuit 59 is a square wave J as shown in FIG. 11f. The square wave curve J thus appears in the lead 65. In FIG. 11f, the abscissa represents time and the ordinate represents the trigger output signal of the third trigger circuit 59. The total output of the central position and zero range indicator of FIG. 9 is provided at the output terminal 66 thereof and is shown in FIG. 11g. In FIG. 11g, the abscissa represents time and the ordinate represents the output signal of the indicator circuit of FIG. 9. Curve K of FIG. 11g is the resultant of curves H, I and J, after they are transferred through the AND-gate 62.

FIG. 12 illustrates the dial portion of the panel 14 of FIG. 1. In FIG. 12, only the two dials 73 and 74 of the decimal fraction are illustrated, since each of the dials of the dial panel 14 is the same as the others. In FIG. 12, the decimal number 2 is set in the seventh dial 74 and represents the hundredths digit of the data. The decimal number 5 is set in the sixth dial 73 and represents the tenths digit of the data. Thus, the decimal fraction set as command data is 0.52.

In FIG. 12, a rotary switch 75 comprises a switch arm 76 which is connected to a point at ground potential, and a plurality of contacts 77a, 77b, 77c and 77d, which are adapted to be contacted by said switch arm in a desired sequence. A relay 78, representing the hundreds digit, is connected between the switch contact 77a and a point at ground potential via a lead 79 and a common ground line 81. A relay 82 is connected between the switch contact 77b and a point at ground potential via lead 83 and the common ground line 81. The relay 82 represents the tens digit. A relay 84 is connected between the switch contact 77c and ground via a lead 85 and the common ground line 81. The relay 84 represents the tenths digit. A relay 86, representing the hundredths digit, is connected between the switch contact 77d and ground via a lead 87 and the common ground line 81.

The contacts controlled by the relays 78 and 82 are not shown in FIG. 12 since only the dials for the sixth and seventh digits are shown in FIG. 12. Thus, FIG. 12 shows the contacts controlled by the relays 84 and 86 only. When the relay 86 is energized, the contacts 86a, 86b and 86c, controlled by said relay, are closed and the hundredths signal 2 is supplied to the input register (hereinafter described) via the contact 86b and a lead 88. When the relay 84 is energized, by the switch arm 76 of the rotary switch 75 making electrical contact with the switch contact 76c, the contacts 84a, 84b and 84c, controlled by the relay 84 are closed. The closing of the contact 84a supplies a tenths signal of 5 to the input register (hereinafter described) via a lead 89. The closing of the contact 84c supplies a tenths digit of 5 to the input register via a lead 91.

FIG. 13 shows a decimal-binary conversion register which may be utilized as the decimal-binary conversion register 15 or 19 of FIG. 1. In FIG. 13, a shift pulse is supplied to an input terminal 92 of a binary register 93. The binary register, which registers the common data, has an output connected to a first input 94 of a full adder 95 via a lead 96, a first delay circuit 97, a lead 98, a second delay circuit 99 and a lead 101. The output of the first delay circuit 97 is supplied to a second input 102 of the full adder 95 via a lead 103, a first switch 104, an OR-gate 105 and a lead 106.

The output of the binary register is also supplied, prior to delay in either the first or second delay circuit 97 or 99, to the second input 102 of the full adder 95 via a lead 96, a lead 107, a second switch 108, the OR-gate 105 and the lead 106. The resultant sum output of the full adder 95 is supplied to the input of the binary register via a lead 109. A carry circuit for the full adder 95 comprises a third delay circuit 111 conected between a carry output of said full adder and a third input 112 of said adder. The dials, such as, for example, the sixth and seventh dials 73 and 74, shown in FIG. 12, are connected to the input of an input register 113 via a lead 114 which represents the leads 88, 89, 91 and a lead 115 of FIG. 12. The output of the input register 113 is connected to the second input 102 of the full adder 95 via a lead 116, a third switch 117, the OR-gate 105 and the lead 106.

The content or data stored in the input register 113 is that which is supplied thereto from the dial panel 14 (FIGS. 1 and 12) and is supplied directly to the second input 103 of the full adder 95 via the third switch 117. The first, second and third switches 104, 108 and 117 are controlled by any suitable means (not shown in the figures) in a manner whereby a magnitude ten times as great as the content of the binary register 93 and the content of the input register 113 may be added to each other. The common value of the decimal fraction of the data is therefore supplied to the binary register 93 as a pure binary number.

FIG. 14 illustrates a comparator which may be utilized as the comparator 16 or 20 of FIG. 1. The comparator of FIG. 14 functions to compare the decimal fraction of the common data, that is, the content of the binary register 93 of FIG. 13, with the value successively transferred from a binary counter 121 of the reversible binary counter of FIG. 18a. In FIG. 14, the output of the binary register 93 of FIG. 13 is supplied to a first input terminal 122 which is connected to a first input of a first AND-gate 123 and to a third input terminal 124 which is connected to a first input of a second AND-gate 125. The output of the binary counter 121 of FIG. 17a is supplied to a second input terminal 126 which is connected to a second input of the first AND-gate 123 and to a fourth input terminal 127 which is connected to a second input of the second AND-gate 125. The output of the first AND-gate 123 is connected to the input of a first amplifier 128. The output of the second AND-gate 125 is connected to the input of a second amplifier 129. The output of the first amplifier 128 is connected to a first input of a first flip flop or bistable multivibrator 131 via a lead 132 and to a second input of a second flip flop or bistable multivibrator 133 via the lead 132, a lead 134, an OR-gate 135, a third amplier 136 and a lead 137.

The output of the second amplifier 129 is connected to a second input of the first flip flop 131 via a lead 138 and a lead 139 and is connected to the second input of the second flip flop 133 via the lead 138, a lead 141, the OR-gate 135, the third amplifier 136 and the lead 137. A start signal is supplied to a first input of the second flip flop 133 via an input terminal 142. A first output of the first flip flop 131 is supplied to a first input of a third AND-gate 143 via a lead 144. A second output of the first flip flop 131 is supplied to a first input of a fourth AND-gate 145 via a lead 146. A first input of the second flip flop 133 is supplied to a first input of a fifth AND-gate 147 via a lead 148. A second output of the second flip flop 133 is supplied to a first input of a sixth AND-gate 149 via a lead 151.

An end signal is supplied to the comparator via an input terminal 152 and is supplied via a common lead 153 to a second input of each of the third, fourth, fifth and sixth AND-gates 143, 145, 147 and 149. The output of the third AND-gate 143 is supplied to a first input of a third flip flop or bistable multivibrator 154 via a fourth amplifier 155. The output of the fourth AND-gate 145 is supplied to a second input of the third flip flop 154 via a fifth amplifier 156. The output of the fifth AND-gate 147 is supplied to a first input of a fourth flip flop 157 via a sixth amplifier 158. The output of the sixth AND-gate 149 is supplied to a second input of the fourth flip flop 157 via a seventh amplifier 159.

A first output of the third flip flop 154 is supplied to a first input of a seventh AND-gate 161 via a lead 162. A second output of the third flip flop 154 is supplied to a first input of an eighth AND-gate 163 via a lead 164. A first input of the fourth flip flop 157 is supplied to a second input of the eighth AND-gate 163 via a lead 165. A second output of the fourth flip flop 157 is supplied to a second input of the seventh AND-gate 161 via a lead 166. The output of the seventh AND-gate 161 is supplied to an output terminal 167 via an eighth amplifier 168, a lead 169 and a lead 171 and is also supplied to a relay 172 via the lead 169 and a lead 173. The relay 172 is connected between the eighth amplifier 168 and a point at ground potential via a lead 174 and a common ground line 175. The output of the eighth AND-gate 163 is supplied to an output terminal 176 via a ninth amplifier 177, a lead 178 and a lead 179 and is also supplied to a relay 181 via the lead 178 and a lead 182. The relay 181 is connected between the ninth amplifier 177 and a point at ground potential via a lead 183 and the common ground line 175.

If the content of the binary register 93 of FIG. 13 is greater than the content of the binary counter 121 of FIG. 18a, an output signal is provided at the output terminal 167 of the comparator of FIG. 14. If the content of the binary register 93 of FIG. 13 is less than the content of the binary counter 121 of FIG. 18a, a signal is provided at the output terminal 176 of the comparator of FIG. 14. If the content of the binary register 93 of FIG. 13 and the content of the binary counter 121 of FIG. 18a are equal to each other, no signal is produced by the comparator of FIG. 14.

Figure 15A:
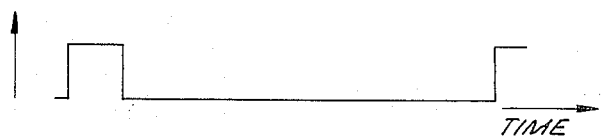
Figure 15B:
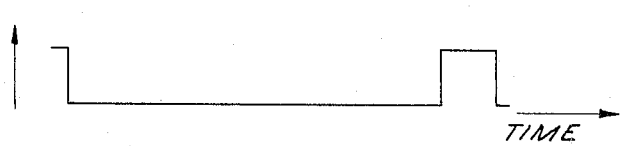
Figure 15C:
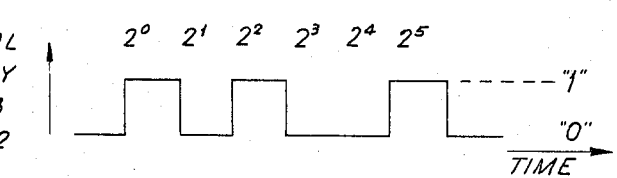
Figure 15D:
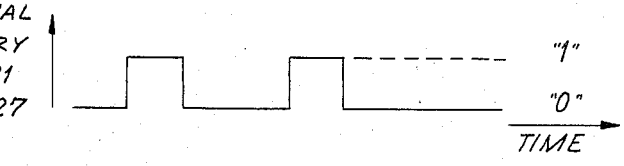
Figure 15E:
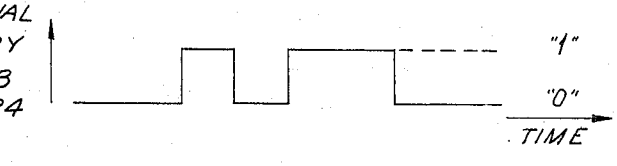
Figure 15F:
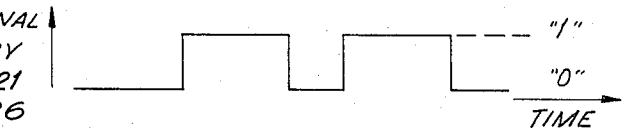

FIGS. 15a to 15f illustrate the waveforms which appear at various points of the comparator of FIG. 14. In each of FIGS. 15a to 15f, the abscissa represents time. In FIG. 15a, the ordinate represents the start signal supplied to the input terminal 142 of FIG. 14. In FIG. 15b, the ordinate represents the end signal supplied to the input terminal 152 of FIG. 14. In FIG. 15c, the ordinate represents the input signal from the binary register 93 of FIG. 13 which is supplied to the input terminal 122 of FIG. 14. In FIG. 15d, the ordinate represents the input signal from the binary counter 121 of FIG. 18a which is supplied to the input terminal 127 of FIG. 14. In FIG. 15e, the ordinate represents the input signal from the binary register 93 of FIG. 13 which is supplied to the input terminal 124 of FIG. 14. In FIG. 15f, the ordinate represents the input signal from the binary counter 121 of FIG. 18a which is supplied to the input terminal 126 of FIG. 14.

As indicated in FIGS. 15c to 15f, the values of the contents of the binary register 93 and the binary counter 121 are shifted successively commencing with the lowest border, as indicated by the times $t_0$, $t_1$, $t_2$, $t_3$, $t_4$ and $t_5$, representing the $2^0$, $2^1$, $2^2$, $2^3$, $2^4$ and $2^5$, respectively. In order to simplify the description of the operation of the comparator of FIG. 14, the foregoing six orders are presented. Thus, as illustrated in FIGS. 15c to 15f, the content of the binary register 93 is $2^5$ plus $2^2$ and the content of the binary counter 121 is $2^3$ plus $2^0$. The contents of the binary register 93 and the binary counter 121 are supplied bit by bit in succession starting with the lowest order to the first and second AND-gates 123 and 125 of FIG. 14 via the input terminals 122, 126, 124 and 127. Thus, as illustrated in FIGS. 15c to 15f, the first flip flop 131 is set at the time $t_2$, is reset at the time $t_3$ and is again set at the time $t_5$.

When the comparison of the highest order has been completed, an end signal (FIG. 15b) is supplied to the input terminal 152 of FIG. 14 and the third flip flop 154 is set. A binary 1 output signal is then provided in the lead 162 extending from the first or set output of the third flip flop 154. During this time, the second flip flop 133 of FIG. 14, which was previously set by a start signal (FIG. 15a) supplied to the input terminal 142, is reset at the time $t_2$. The fourth flip flop 157 is reset upon the supply of the end signal to the input terminal 152 and a binary 1 output signal is provided in the lead 166 which is the second or reset output of said fourth flip flop. Since there is then an output signal in the lead 162 and an output signal in the lead 166, the seventh AND-gate 161 is switched to its conductive condition and an output signal is provided at the output terminal 167. The start and end signals, shown in FIGS. 15a and 15b, are supplied just prior to the lowest order digit and just subsequent to the highest order digit, respectively.

The decimal-binary conversion register of FIG. 13 is for the decimal fraction of the data. The decimal-binary conversion register for the integer of the data is not disclosed since it is identical with the decimal-binary register of FIG. 13. In the decimal-binary conversion register for the integer of the data (not shown in the figures), a second flip flop 184 of the compensator of FIG. 19 is set by a signal provided at the output terminal of said decimal-binary conversion register comparator equivalent to the output terminal 176 of the comparator of FIG. 14, which signal is supplied to the second input terminal 185 of the compensator of FIG. 19. A signal −1 is then added to the content of a binary counter 186 of the reversible binary counter of FIG. 18b. On the other hand, the compensation of ±1 of the content of the binary counter 186 of the reversible binary counter of FIG. 18b is hereinafter described. When such compensation, as hereinafter described, is necessary, +1 or −1 is added by a full adder 187 of the reversible binary counter of FIG. 18b when a signal is supplied to either one of a third input terminal 188 and a fourth input terminal 189 of the compensator of FIG. 19 and when a compensation instruction pulse is supplied to an input terminal 191 of said compensator of FIG. 19.

FIG. 16 shows a drive circuit for the drive motor 10 of FIG. 1. The drive motor 10 is energized by an AC source which applies an AC voltage to the input terminals 192 and 193. When the relay 172 of the comparator of FIG. 14 is energized, it operates its contact 172a so that said contact moves to the position opposite that shown in FIG. 16 and the motor is rotated in a positive direction. When the relay 181 of the comparator of FIG. 14 is energized, it operates its contact 181a so that said contact is moved to its position opposite that shown in FIG. 16 and the motor is driven or rotated in the negative direction.

FIG. 17 illustrates a reversible select gate which may be utilized as the select gate 17 or 21 of FIG. 1. The reversible select gate of FIG. 17 comprises a first flip flop 196 and a second flip flop 197. A pulse train provided by the pulse generator 12 is supplied to the first and second flip flops 196 and 197 via an input terminal 198, a lead 199, a lead 201 and a lead 202. The signal provided at the output terminal 167 of the comparator of FIG. 14 is supplied to a first input of the first flip flop 196 via a lead 203; output terminal 167 of FIG. 14 being coincident with the input terminal 167 of FIG. 17. The signal provided at the output terminal 176 of the comparator of FIG. 14 is supplied to a first input of the second flip flop 197 via a lead 204 the output terminal 176 of FIG. 14 being coincident with the input terminal 176 of FIG. 17. A reset signal is supplied to the second input of each of the first and second flip flops 196 and 197 via an input terminal 205, a lead 206, a lead 207 and a lead 208.

The output of the first flip flop 196 is supplied to a first input of a first AND-gate 209 via a lead 211. The output of the second flip flop 197 is supplied to a first input of a second AND-gate 212 via a lead 213. A +1 signal is supplied to a second input of the first AND-gate 209 via an input terminal 214. A −1 signal is supplied to a second input of the second AND-gate 212 via an input terminal 215. The outputs of the first and second AND-gates 209 and 212 are supplied to the inputs of an OR-gate 216 via leads 217 and 218, respectively. The output of the OR-gate 216 is amplified in an amplifier 219 and is provided at an output terminal 221 via leads 222 and 223. The output of the OR-gate 216 after amplification in the amplifier 219, is also provided at an output terminal 224 after inversion in an inverter 225 via a lead 226.

If the content of the binary counter 121 of the reversible binary counter of FIG. 18a is smaller than the command data of the decimal fraction, that is, the content of the binary register 93 of FIG. 13, the comparator of FIG. 14 provides a signal at its output terminal 167, which signal is thus supplied via the input terminal 167 to the reversible select gate of FIG. 17. Thus, each time a feedback pulse provided by the pulse generator 12 (FIGS. 1 and 5) is supplied to the reversible select gate via the input terminal 198, the first flip flop 196 is set and the +1 signal supplied to the first AND-gate 209 is transferred through said AND-gate and is added to the content of the binary counter 121 of the reversible binary counter of FIG. 18a.

FIGS. 18a and 18b disclose a binary counter which may be utilized as the reversible binary counter 18 or 22 of FIG. 1. FIG. 18a discloses the reversible binary counter for the decimal fraction of the data and FIG. 18b discloses the reversible binary counter for the integer of the data. In FIG. 18a, a shift pulse is supplied to the binary counter 121 via an input terminal 227 and the output of said binary counter is supplied to the comparator 16 (FIG. 1) shown in FIG. 14 via a lead 228. The output of the binary counter 121 is supplied to the input terminals 126 and 127 of FIG. 14.

The output of the binary counter 121 is supplied to a first input 229 of a full adder 231 via a lead 232. A signal from the pulse generator 12 of FIGS. 1 and 5 is supplied to an input of the reversible select gate of FIG. 17 via an input terminal 233. A signal from the comparator of FIG. 14 is supplied to another input of the reversible select gate of FIG. 17 via an input terminal 234. The output of the reversible select gate of FIG. 17 is supplied to a second input 235 of the full adder 231 via a lead 236. The resultant sum provided by the full adder 231 is supplied to the input of the binary counter 121 via a lead 237. A carry of the full adder 231 is provided at a third input 238 of said adder after passing through a delay circuit 239.

The reversible binary counter of FIG. 18a indicates the actual position of the detector head 5 of FIG. 1 with respect to a constant point of the table 1 at the time that said detector is preset; that is, the time that the decimal fraction of the data determines its position. When the detector head 5 is preset in accordance with the decimal fraction, ±1 is added to the content of the binary counter 121 in accordance with the result of the comparison operation by the comparator each time a pulse is supplied from the pulse generator 12.

The reversible binary counter 18b for the integer of the data is the same as the reversible binary counter of FIG. 18a. In FIG. 18b, the binary counter 186 is connected in the same relation with the full adder 187 as in FIG. 18a. A signal is supplied to a second input 241 of the full adder 187 from the pulse generator 12 of FIG. 1 via an input terminal 242 and a lead 243. +1 or −1 is added to the content of the binary counter 186 each time a pulse is provided by the pulse generator 12. In addition, however, +1 or −1 must be provided as compensation in accordance with the zero range signal supplied by the central position and zero range indicator of FIG. 9.

FIGS. 19 and 20 show a compensator circuit which may be utilized as the compensator 23 of FIG. 1. FIG. 20 discloses a circuit for providing input signals for the third and fourth input terminals 188 and 189 of the compensator of FIG. 19. Thus, the output terminals 188 and 189 are identical with the input terminals 188 and 189 of FIG. 19.

In FIG. 20, the signal in the lead 162 of the comparator of FIG. 14 is supplied to an input terminal 244 and the corresponding signal from the other comparator (not shown) is supplied to an input terminal 245. The signal in the lead 164 of the comparator of FIG. 14 is supplied to an input terminal 246 and the corresponding signal of the other comparator (not shown) is supplied to an input terminal 247. The signal in the lead of the other comparator (not shown) corresponding to the lead 165 is supplied to an input terminal 248. The signal in the lead of the other comparator (not shown) corresponding to the lead 166 of the comparator of FIG. 14 is supplied to an input terminal 249. The inverse of the zero range signal provided at the output terminal 66 of the central position and zero range indicator of FIG. 9 is supplied to an input terminal 251 and to an input terminal 252.

The input terminal 244 is connected to a first input of a first AND-gate 253. The input terminals 245 and 248 are connected to the inputs of a first OR-gate 254. The output of the OR-gate is connected to a second input of the first AND-gate 253 via an amplifier 255. The input terminal 251 is connected to a third input of the first AND-gate 253. The input terminal 246 is connected to a first input of a second AND-gate 256. The input terminals 247 and 249 are connected to the inputs of a second OR-gate 257. The output of the second OR-gate 257 is connected to a second input of the second AND-gate 256 via an amplifier 258. The input terminal 252 is connected to a third input of the second AND-gate 256.

The output of the first AND-gate 253 is supplied to a first input of a first flip flop 259 via an amplifier 261 and a lead 262. The output of the second AND-gate 256 is supplied to a first input of a second flip flop 263 via an amplifier 264 and a lead 265. A reset signal is supplied to a second input of each of the first and second flip flops 259 and 263 via an input terminal 266, a lead 267, a lead 268 and a lead 269. The output of the first flip flop 259 is provided at the output terminal 188 and the output of the second flip flop 263 is provided at the output terminal 189.

In FIG. 20, when a signal is supplied to the input terminal 244, it indicates that the content of the binary register 93 of FIG. 13 is greater than the content of the binary counter 121. When a signal is supplied to the input terminal 245, it indicates that the content of the binary register of the decimal-binary conversion register for the integer of the data corresponding to the binary register 93 of FIG. 13 is greater than the content of the binary counter 186 of FIG. 18b. When a signal is supplied to the input terminal 248 of FIG. 20, it indicates that the content of the binary register of the decimal-binary conversion register for the integer of the data is equal to the content of the binary counter 186 of FIG. 18b. The signal supplied to the input terminals 251 and 252 is the inverse of the zero range signal.

The circuit of FIG. 20 functions to indicate whether or not it is necessary to provide compensation in accordance with the conditions indicated in Table II as hereinbefore indicated.

In FIG. 19, a signal provided at an output terminal of the comparator for the integer of the data which corresponds to the output terminal 167 of the comparator of FIG. 14 is supplied to a first input terminal 271. FIG. 19 functions to provide compensation as required. If the integer of the command data is greater than the integer of the data representing the actual position, a signal is supplied to the first input terminal 271. The first input terminal 271 is connected to a first input of a first flip flop 272. The second input terminal 185 is connected to a first input of the second flip flop 184. The third input terminal 188 is connected to a first terminal of a third flip flop 273. The fourth input terminal 189 is connected to a first input of a fourth flip flop 274. The signal supplied to the input terminal 191 is supplied to the third and fourth flip flops 273 and 274 via a lead 275, a lead 276 and a lead 277. A reset signal is supplied to a second input of each of the first and second flip flops 272 and 184 via an input terminal 278, a lead 279, a lead 281 and a lead 282. A reset signal is supplied to a second input of each of the third and fourth flip flops 273 and 274 via an input terminal 283, a lead 284, a lead 285 and a lead 286. A signal provided by the pulse generator 12 is supplied to an input terminal 287 and is supplied to each of the first and second flip flops 272 and 184 via a lead 288, a lead 289 and a lead 291. The output of the first flip flop is supplied to a first input of a first AND-gate 292 via a lead 293. The output of the second flip flop 184 is supplied to a first input of a second AND-gate 294 via a lead 295. The output of the third flip flop 273 is supplied to a first input of a third AND-gate 296 via a lead 297. The output of the fourth flip flop 274 is supplied to a first input of a fourth AND-gate 298 via a lead 299.

A signal +1 is supplied to a second input of the first AND-gate 292 and the third AND-gate 296 via an input terminal 301, a lead 302, a lead 303, and a lead 304. A signal −1 is supplied to a second input of the second AND-gate 294 and the fourth AND-gate 298 via a lead 306, a lead 307 and a lead 308. The outputs of the first, second, third and fourth AND-gates 292, 294, 296 and 298 are supplied to the inputs of an OR-gate 309. The output of the OR-gate 309 is connected to an output terminal 311 via a lead 312, an amplifier 313, a lead 314 and a lead 315. The output of the amplifier 313 is also provided at output terminal 316 via the lead 314, a lead 317, an inverter 318 and a lead 319.

Each time a pulse is supplied to the input terminal 287 from the pulse generator 12 (FIG. 1) the first flip flop 272 is set and a signal +1 is added to the count of the binary counter 186 of FIG. 18b. Signals are supplied to the first and second input terminals 271 and 185, and at the same time they energize relays in the comparator for the integer of the data which correspond to the relays 172 and 181 of the comparator for the decimal fraction of FIG. 14. The relays rotate the drive motor 4 in the indicated direction via the contacts of said relays which correspond to the contacts 172a and 181a of FIG. 16.

FIG. 21 is a flip flop which may be utilized as the flip flop of the various figures. The flip flop of FIG. 21 is a known bistable multivibrator and may be utilized as the flip flop in the various circuits disclosed herein. The flip flop has two pairs of input terminals 321a and 321b, and 322a and 322b. The flip flop of FIG. 21 has a pair of output terminals 323 and 324 and a pair of trigger terminals 325 and 326. Input signals are supplied to the input terminals 322a and 322b which are inverse to each other and input signals are supplied to the input terminals 321a and 321b which are also inverse to each other. If a trigger pulse is supplied to the trigger terminal 325, a signal is provided at the output terminal 323 which is the same as the signal which is supplied to the input terminal 321a and a signal is provided at the output terminal 324 which is the same as the signal supplied to the input terminal 321b. If a trigger pulse is supplied to the trigger terminal 326, a signal is provided at the output terminal 323 which is the same as the signal supplied to the input terminal 322a and a signal is provided at the output terminal 324 which is the same as the signal supplied to the input terminal 322b.

FIG. 22 shows an AND-gate which may be utilized as the AND-gate of the various figures. In FIG. 22, the AND-gate has a first input 331 and a second input 332. The AND-gate has an output 333. The AND-gate of FIG. 22, is a known circuit.

FIG. 23 discloses an OR-gate which may be utilized as the OR-gate of the various figures. The OR-gate of FIG. 23 has a first input 334, a second input 335 and an output 336. The OR-gate of FIG. 23 comprises a known circuit.

FIG. 24 shows an AND–OR circuit which may be utilized as the AND–OR circuit of FIG. 17. The AND–OR gate of FIG. 24 comprises 4 inputs 337, 338, 339 and 341 and an output 342. The operation of the AND–OR circuit of FIG. 24 is essentially that of a pair of AND-gates 343 and 344 which feed an OR-gate 345.

FIG. 25 discloses an inverter which may be utilized as the inverter of the various figures. The inverter of FIG. 25 is a known circuit having an input 346 and an output 347. The inverter of FIG. 25 functions in the usual manner to produce at the output 347 no signal when a signal is supplied to the input 346 and to produce at said output a signal when no signal is supplied to said input.

FIG. 26 is a circuit diagram of a full adder which may be utilized as the full adder of FIGS. 13, 18a and 18b. The full adder circuit of FIG. 26 is well known and comprises a plurality of inputs 348, 349, 351 and 352 and a pair of outputs 353 and 354.

FIG. 27 is an input register which may be utilized as the input register of FIG. 13. The input register of FIG. 27 comprises four cascade-connected flip flops 355, 356, 357 and 358. It is assumed that the numerical value 2 which is set in the hundredths position dial N7 (FIG. 1) and the corresponding dial 74 (FIG. 12) of the dial panel 14 is also set as the hundredths digit of the binary-coded decimal fraction in the flip flops 355, 356, 357 and 358 of FIG. 2. In such a case, only the second flip flop 356 provides an output signal of binary 1 in its output which is supplied to an output terminal 359 via a lead 361.

The settings of the various dials of the dial panel 14 are also set in the flip flops 355, 356, 357 and 358 by supplying an input set pulse to an input terminal 362 of FIG. 27. The input set pulse supplied to the input terminal 362 is supplied to each of the flip flops 355 to 358 via a common lead 363. The content of the input register of FIG. 27 is shifted by supplying a shift pulse to an input terminal 364. The shift pulse supplied to the input terminal 364 is supplied to each of the flip flops 355 to 358 via a common lead 365. The outputs of the input register are provided at output terminals 366 and 367 which are connected to the outputs of the first flip flop 355 which corresponds to the lowest order digit via leads 368 and 369, respectively.

FIG. 28 shows a binary register which may be utilized as the binary register of FIGS. 13, 18a and 18b. The binary register of FIG. 28 comprises a plurality of flip flops 371, 372, 373, 374, 375, 376 and 377 connected in cascade arrangement. The binary register of FIG. 28 is for the decimal fraction of the data. The binary register for the integer of the data is identical with that shown in FIG. 28. A shift pulse is supplied to each of the flip flops 371 to 377 via an input terminal 378 and a common lead 379. The resultant sum signals from the full adder such as, for example, the full adder 95 of FIG. 13, is supplied to input terminals 381 and 382 which are connected to first and second inputs of the flip flop 377 which represents the highest order digit. The outputs of the binary register are provided at output terminals 383 and 384 which are connected to the outputs of the flip flop 371, which corresponds to the lowest order digit, via leads 385 and 386, respectively.

While the invention has been described by means of specific examples and in a specific embodiment we do not wish to be limited thereto, for obvious modifications will occur to those skilled in the art without departing from the spirit and scope of the invention.

We claim:

1. A digital system for controlling the position along a given path of a movable structure movably mounted on a fixed structure, comprising drive means coupled to said movable structure for displacing said movable structure;

detector means mounted on said two structures for detecting positional variation of said movable structure along said path; said detector means comprising scale means affixed to one of said structures, said scale means comprising a plurality of spaced indications, and an optical detecting element movably mounted on the other of said structures in operative proximity with said scale means, said detector means including zero range means for providing a zero range at a given interval for each indication of said scale means;

datum setting means having a first portion selectively adjustable for setting the major amount of a desired positional datum value and having a second portion selectively adjustable for setting the residual amount of said datum value;

presetting control means coupled to said optical detecting element for moving said optical detecting element relative to said structure in accordance with said residual amount, said presetting control means comprising first register means having an output and a content equal to that of the second portion of said datum setting means, a servomotor coupled to said optical detecting element for moving said optical detecting element along said given path, a pulse generator coupled to said optical detecting element for providing pulses corresponding in number to the displacement of said optical detecting element, first counter means having an output and an input connected to said pulse generator for counting pulses generated by said pulse generator, first comparator means having an output connected to said servomotor, an input connected to the output of said first counter means and an input connected to the output of said first register means for comparing the contents of said first register means and said first counter means and for energizing said servomotor until coincidence of the contents of said first register means and first counter means;

drive control means coupled to said drive means, said drive control means comprising second register means having an output and a content equal to that of the first portion of said datum setting means, second counter means having an output and an input connected to said detector means for counting pulses generated by said detector means, second comparator means having an output connected to said drive means, an input connected to the output of said second counter means and an input connected to the output of said second register means for comparing the contents of said second register means and second counter means for energizing said drive means until coincidence of the contents of said second register means and second counter means; and zero compensating means having an output connected to an input of said second counter means, an input connected to the output of said first comparator means, an input connected to the output of said second comparator means and an input connected to said detector means for selectively varying the count of said second counter means in accordance with indications outside said zero range.

2. A digital system as claimed in claim 1, wherein said zero range means comprises square wave pulse shaping means.

3. A digital system as claimed in claim 1, wherein said zero range means comprises an opaque shield having a slit formed therethrough and positioned in the path of said optical detecting element.

4. A digital system as claimed in claim 1, wherein each of said first and second counter means comprises a reversible counter.

5. A digital system as claimed in claim 1, wherein each of said first and second counter means comprises a reversible binary counter.

6. A digital system as claimed in claim 1, wherein said presetting control means comprises a first feedback loop and said drive control means comprises a second feedback loop.

7. A digital system as claimed in claim 1, wherein said presetting control means comprises a fine adjustment loop and said drive control means comprises a coarse adjustment loop.

References Cited

UNITED STATES PATENTS

| | | | |
|---|---|---|---|
| 2,785,353 | 3/1957 | Fenemore | 318—28 |
| 3,004,251 | 10/1961 | Rapacz | 340—347 |
| 3,020,460 | 2/1962 | Morin et al. | 318—28 |
| 3,099,777 | 7/1963 | Davis | 318—28 |
| 3,099,781 | 7/1963 | Herchenroeder | 318—162 |
| 3,248,622 | 4/1966 | Kelling | 318—28 |
| 3,323,030 | 4/1967 | Inaba et al. | 318—18 |

BENJAMIN DOBECK, *Primary Examiner.*